US010859871B2

(12) United States Patent
Nakamura et al.

(10) Patent No.: US 10,859,871 B2
(45) Date of Patent: Dec. 8, 2020

(54) OPTICAL MEMBER, AND POLARIZING PLATE SET AND LIQUID CRYSTAL DISPLAY DEVICE THAT USE SAID OPTICAL MEMBER

(71) Applicant: NITTO DENKO CORPORATION, Ibaraki (JP)

(72) Inventors: Kozo Nakamura, Ibaraki (JP); Kazuhito Hosokawa, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 15/758,615

(22) PCT Filed: Sep. 27, 2016

(86) PCT No.: PCT/JP2016/078517
§ 371 (c)(1),
(2) Date: Mar. 8, 2018

(87) PCT Pub. No.: WO2017/057395
PCT Pub. Date: Apr. 6, 2017

(65) Prior Publication Data
US 2018/0252968 A1 Sep. 6, 2018

(30) Foreign Application Priority Data

Sep. 28, 2015 (JP) ................... 2015-189746
Sep. 7, 2016 (JP) ................... 2016-174593

(51) Int. Cl.
*G02F 1/1335* (2006.01)
*G02F 1/13357* (2006.01)
*F21V 8/00* (2006.01)

(52) U.S. Cl.
CPC ..... *G02F 1/133606* (2013.01); *G02B 6/0053* (2013.01); *G02B 6/0056* (2013.01);
(Continued)

(58) Field of Classification Search
CPC ......... G02F 1/133528; G02F 1/133504; G02F 2001/133507; G02F 1/13363;
(Continued)

(56) References Cited

U.S. PATENT DOCUMENTS 5,587,816 A 12/1996 Gunjima et al.
5,828,488 A 10/1998 Ouderkirk et al.
(Continued)

FOREIGN PATENT DOCUMENTS

CN 1138379 A 12/1996
CN 1854817 A 11/2006
(Continued)

OTHER PUBLICATIONS

International Search Report dated Dec. 20, 2016, issued in counterpart application No. PCT/JP2016/078517, w/ English translation. (12 pages).
(Continued)

*Primary Examiner* — Hoan C Nguyen
(74) *Attorney, Agent, or Firm* — Westerman, Hattori, Daniels & Adrian, LLP

(57) ABSTRACT

Provided is an optical member that can achieve a liquid crystal display apparatus that is excellent in mechanical strength, has an excellent hue, and shows little change in hue dependent on a viewing angle. The optical member includes a prism sheet and an optically functional element that are integrated with each other. The prism sheet has: a first main surface, which is flat; and a second main surface, on which a plurality of unit prisms each having a columnar shape convex toward an opposite side to the first main surface are arrayed. Convex portions formed by the plurality of unit prisms on the second main surface of the prism sheet are bonded to one main surface of the optically functional element.

20 Claims, 2 Drawing Sheets

(52) U.S. Cl.
CPC .. *G02F 1/133603* (2013.01); *G02F 1/133536* (2013.01); *G02F 2001/133607* (2013.01); *G02F 2001/133614* (2013.01)

(58) Field of Classification Search
CPC ... G02F 1/133617; G02F 2001/133614; G02F 1/133609; G02F 1/133603; G02F 1/133615; G02F 2202/108; G02F 1/133512; G02F 1/0105; G02F 2001/133388; G02F 1/133611; G02B 5/045; G02B 5/0205; G02B 5/3025; G02B 5/0294; G02B 5/3083; G02B 6/0056; G02B 6/0055; G02B 6/005; G02B 5/305; G02B 5/22; G02B 6/0023; G02B 6/0073; G02B 6/0065; H01L 27/1225; H01L 29/7869; F21V 9/14
See application file for complete search history.

(56) References Cited

U.S. PATENT DOCUMENTS

| | | | |
|---|---|---|---|
| 5,882,774 | A | 3/1999 | Jonza et al. |
| 5,962,114 | A | 10/1999 | Jonza et al. |
| 5,965,247 | A | 10/1999 | Jonza et al. |
| 6,025,897 | A | 2/2000 | Weber et al. |
| 6,045,894 | A | 4/2000 | Jonza et al. |
| 6,096,375 | A | 8/2000 | Ouderkirk et al. |
| 6,117,530 | A | 9/2000 | Jonza et al. |
| 6,124,971 | A | 9/2000 | Ouderkirk et al. |
| 6,262,842 | B1 | 7/2001 | Ouderkirk et al. |
| 6,296,927 | B1 | 10/2001 | Jonza et al. |
| 6,486,997 | B1 | 11/2002 | Bruzzone et al. |
| 6,498,683 | B2 | 12/2002 | Condo et al. |
| 6,531,230 | B1 | 3/2003 | Weber et al. |
| 6,543,153 | B1 | 4/2003 | Weber et al. |
| 6,613,421 | B2 | 9/2003 | Jonza et al. |
| 6,635,337 | B2 | 10/2003 | Jonza et al. |
| 6,721,096 | B2 | 4/2004 | Bruzzone et al. |
| 6,744,561 | B2 | 6/2004 | Condo et al. |
| 6,788,463 | B2 | 9/2004 | Merrill et al. |
| 6,797,366 | B2 | 9/2004 | Hanson et al. |
| 6,804,058 | B1 | 10/2004 | Ouderkirk et al. |
| 6,888,675 | B2 | 5/2005 | Ouderkirk et al. |
| 6,888,677 | B2 | 5/2005 | Condo et al. |
| 7,023,602 | B2 | 4/2006 | Aastuen et al. |
| 7,038,745 | B2 | 5/2006 | Weber et al. |
| 7,083,847 | B2 | 8/2006 | Jonza et al. |
| 7,138,173 | B2 | 11/2006 | Wheatley et al. |
| 7,141,297 | B2 | 11/2006 | Condo et al. |
| 7,297,393 | B2 | 11/2007 | Jonza et al. |
| 7,321,464 | B2 | 1/2008 | Ouderkirk et al. |
| 7,423,708 | B2 | 9/2008 | Weber et al. |
| 7,535,524 | B2 | 5/2009 | Chua et al. |
| 7,652,820 | B2 | 1/2010 | Aastuen et al. |
| 7,712,908 | B2 | 5/2010 | Hoshi et al. |
| 7,851,054 | B2 | 12/2010 | Weber et al. |
| 7,852,560 | B2 | 12/2010 | Ouderkirk et al. |
| 7,918,571 | B2 | 4/2011 | Hoshi et al. |
| 8,109,637 | B2 | 2/2012 | Okuyama et al. |
| 8,734,608 | B2 | 5/2014 | Sung |
| 8,789,993 | B2 | 7/2014 | Vissenberg et al. |
| 8,852,470 | B2 | 10/2014 | Sung |
| 8,942,522 | B2 | 1/2015 | Edmonds et al. |
| 8,947,799 | B2 | 2/2015 | Edmonds et al. |
| 9,097,933 | B2 * | 8/2015 | Ki ................... G02B 5/3041 |
| 9,116,285 | B2 | 8/2015 | Edmonds et al. |
| 9,140,831 | B2 | 9/2015 | Kuroda et al. |
| 9,588,270 | B2 | 3/2017 | Merrill et al. |
| 9,733,512 | B2 | 8/2017 | Saneto et al. |
| 2001/0008464 | A1 | 7/2001 | Ouderkirk et al. |
| 2002/0031676 | A1 | 3/2002 | Jonza et al. |
| 2002/0039235 | A1 | 4/2002 | Condo et al. |
| 2002/0061393 | A1 | 5/2002 | Jonza et al. |
| 2002/0109795 | A1 | 8/2002 | Bruzzone et al. |
| 2002/0154406 | A1 | 10/2002 | Merrill et al. |
| 2003/0035972 | A1 | 2/2003 | Hanson et al. |
| 2003/0053215 | A1 | 3/2003 | Condo et al. |
| 2003/0164914 | A1 | 9/2003 | Weber et al. |
| 2003/0184864 | A1 | 10/2003 | Bruzzone et al. |
| 2004/0043205 | A1 | 3/2004 | Jonza et al. |
| 2004/0085642 | A1 | 5/2004 | Condo et al. |
| 2005/0019530 | A1 | 1/2005 | Merrill et al. |
| 2005/0024726 | A1 | 2/2005 | Ouderkirk et al. |
| 2005/0079333 | A1 | 4/2005 | Wheatley et al. |
| 2005/0122587 | A1 | 6/2005 | Ouderkirk et al. |
| 2005/0186408 | A1 | 8/2005 | Condo et al. |
| 2005/0270439 | A1 | 12/2005 | Weber et al. |
| 2006/0098284 | A1 | 5/2006 | Aastuen et al. |
| 2006/0169998 | A1 | 8/2006 | Radkov et al. |
| 2006/0232725 | A1 | 10/2006 | Chua et al. |
| 2006/0262400 | A1 | 11/2006 | Ouderkirk et al. |
| 2006/0269724 | A1 | 11/2006 | Ohashi et al. |
| 2006/0284532 | A1 | 12/2006 | Kurihara et al. |
| 2006/0286396 | A1 | 12/2006 | Jonza |
| 2007/0091230 | A1 | 4/2007 | Ouderkirk et al. |
| 2007/0121034 | A1 | 5/2007 | Ouderkirk et al. |
| 2007/0184274 | A1 | 8/2007 | Wheatley et al. |
| 2008/0186428 | A1 * | 8/2008 | Sakamoto ......... G02F 1/133617 349/62 |
| 2008/0213508 | A1 | 9/2008 | Nagasawa et al. |
| 2008/0247192 | A1 | 10/2008 | Hoshi et al. |
| 2008/0316431 | A1 | 12/2008 | Okuyama et al. |
| 2009/0079909 | A1 | 3/2009 | Ouderkirk et al. |
| 2009/0155540 | A1 | 6/2009 | Merrill et al. |
| 2009/0316270 | A1 | 12/2009 | Sung |
| 2009/0323180 | A1 | 12/2009 | Weber et al. |
| 2010/0165466 | A1 | 7/2010 | Endo et al. |
| 2010/0188608 | A1 | 7/2010 | Hoshi et al. |
| 2010/0246021 | A1 * | 9/2010 | Sung ................... G02B 5/045 359/625 |
| 2010/0283072 | A1 | 11/2010 | Kazlas et al. |
| 2011/0116021 | A1 | 5/2011 | Araki et al. |
| 2011/0121234 | A1 | 5/2011 | Hirosaki |
| 2012/0105957 | A1 | 5/2012 | Merrill et al. |
| 2012/0113672 | A1 | 5/2012 | Dubrow et al. |
| 2012/0120344 | A1 | 5/2012 | Kuroda et al. |
| 2012/0163027 | A1 | 6/2012 | Vissenberg et al. |
| 2012/0206935 | A1 | 8/2012 | Seo et al. |
| 2012/0281290 | A1 | 11/2012 | Sung |
| 2012/0281291 | A1 | 11/2012 | Sung |
| 2013/0004728 | A1 * | 1/2013 | Boyd .................. G02B 6/0053 428/172 |
| 2013/0022315 | A1 | 1/2013 | Edmonds et al. |
| 2013/0039077 | A1 | 2/2013 | Edmonds et al. |
| 2013/0063956 | A1 | 3/2013 | Sung |
| 2013/0235461 | A1 | 9/2013 | Sung |
| 2013/0308194 | A1 | 11/2013 | Sung |
| 2015/0124195 | A1 * | 5/2015 | Chen ................ G02F 1/133512 349/61 |
| 2015/0153021 | A1 | 6/2015 | Edmonds et al. |
| 2015/0160401 | A1 | 6/2015 | Namekata et al. |
| 2015/0226999 | A1 | 8/2015 | Fuchida et al. |
| 2015/0260903 | A1 * | 9/2015 | Kashima ............. G02B 6/0056 349/65 |
| 2015/0277012 | A1 * | 10/2015 | Nakamura ............. G02B 5/045 349/96 |
| 2016/0003998 | A1 * | 1/2016 | Benoit ............. G02F 1/133502 349/71 |
| 2016/0147101 | A1 | 5/2016 | Saneto et al. |
| 2016/0154275 | A1 | 6/2016 | Saneto et al. |
| 2016/0161661 | A1 * | 6/2016 | Cho ................. G02F 1/133615 362/606 |
| 2016/0274414 | A1 | 9/2016 | Ishikawa |

FOREIGN PATENT DOCUMENTS

| | | |
|---|---|---|
| CN | 1881034 A | 12/2006 |
| CN | 101241265 A | 8/2008 |
| CN | 101329422 A | 12/2008 |
| CN | 101414019 A | 4/2009 |
| CN | 101589332 A | 11/2009 |
| CN | 102498422 A | 6/2012 |

(56) References Cited

FOREIGN PATENT DOCUMENTS

| | | | |
|---|---|---|---|
| CN | 102822702 | A | 12/2012 |
| JP | 1-317115 | A | 12/1989 |
| JP | 9-507308 | A | 7/1997 |
| JP | H10-319393 | A | 12/1998 |
| JP | 11-84111 | A | 3/1999 |
| JP | 2001-343529 | A | 12/2001 |
| JP | 3448626 | B2 | 9/2003 |
| JP | 2004-325647 | A | 11/2004 |
| JP | 2006-11175 | A | 1/2006 |
| JP | 2007-155940 | A | 6/2007 |
| JP | 2007-286573 | A | 11/2007 |
| JP | 2008-40171 | A | 2/2008 |
| JP | 2008-176206 | A | 7/2008 |
| JP | 2008176206 | A * | 7/2008 |
| JP | 2008-180936 | A | 8/2008 |
| JP | 2008-216963 | A | 9/2008 |
| JP | 2010-107902 | A | 5/2010 |
| JP | 2010-189212 | A | 9/2010 |
| JP | 2010-533976 | A | 10/2010 |
| JP | 2011-107248 | A | 6/2011 |
| JP | 2011-221376 | A | 11/2011 |
| JP | 2012-73580 | A | 4/2012 |
| JP | 2012-83740 | A | 4/2012 |
| JP | 2012-169271 | A | 9/2012 |
| JP | 2012-189802 | A | 10/2012 |
| JP | 2013-28814 | A | 2/2013 |
| JP | 2013-524298 | A | 6/2013 |
| JP | 2013-254183 | A | 12/2013 |
| JP | 2013-544018 | A | 12/2013 |
| JP | 2014-224963 | A | 12/2014 |
| JP | 2015-36733 | A | 2/2015 |
| JP | 2015-43077 | A | 3/2015 |
| JP | 2015-65158 | A | 4/2015 |
| JP | 2015-84327 | A | 4/2015 |
| JP | 2015-102857 | A | 6/2015 |
| JP | 2015-111518 | A | 6/2015 |
| KR | 2012005086 | * | 7/2012 |
| KR | 10-2013-0123718 | A | 11/2013 |
| WO | 95/17691 | A1 | 6/1995 |
| WO | 01/37007 | A1 | 5/2001 |
| WO | 2004/113966 | A1 | 12/2004 |

OTHER PUBLICATIONS

Office Action dated Nov. 29, 2019, issued in counterpart CN Application No. 201680056272.0, with English translation. (26 pages).

Li Zhaohui et. al., "Design and Analysis of the Polarization-Preserving Films for Rectangular Prism", Chinese Journal of Lasers, vol. 42, No. 3, Mar. 2015, pp. 0316002 with English translation.

Martina Gerken et al., "Multilayer Thin-Film Structures with High Spatial Dispersion", Applied Optics, vol. 42, No. 7, Mar. 1, 2003, pp. 1330-1345.

Chinese Notice of Allowance dated Aug. 20, 2020 issued in counterpart application 201680056272.0 with machine translation.

* cited by examiner

OPTICAL MEMBER, AND POLARIZING PLATE SET AND LIQUID CRYSTAL DISPLAY DEVICE THAT USE SAID OPTICAL MEMBER

TECHNICAL FIELD

The present invention relates to an optical member, a polarizing plate set, and a liquid crystal display apparatus. More specifically, the present invention relates to an optical member in which a prism sheet and an optically functional element are integrated with each other, and a polarizing plate set and a liquid crystal display apparatus each using the optical member.

BACKGROUND ART

In recent years, as a display, a liquid crystal display apparatus using a surface light source device has been remarkably widespread. In a liquid crystal display apparatus including an edge light-type surface light source device, for example, light emitted from a light source enters a light guide plate, and propagates through an inside of the light guide plate while repeating total reflection on a light output surface (liquid crystal cell-side surface) of the light guide plate and a back surface thereof. Part of the light that propagates through the inside of the light guide plate allows a traveling direction thereof to be changed by a light scattering body or the like, which is arranged on the back surface of the light guide plate or the like, and is output from the light output surface to an outside of the light guide plate. Such light output from the light output surface of the light guide plate is diffused and condensed by various optical sheets, such as a diffusing sheet, a prism sheet, and a brightness enhancement film, and thereafter, the light enters a liquid crystal display panel in which polarizing plates are arranged on both sides of a liquid crystal cell. Liquid crystal molecules of a liquid crystal layer of the liquid crystal cell are driven for each of pixels to control transmission and absorption of the incident light. As a result, an image is displayed. The above-mentioned prism sheet is typically used in the liquid crystal display apparatus in separate arrangement with the back-surface side polarizing plate. Specifically, the prism sheet is fitted into a casing of the surface light source device, and is arranged close to the light output surface of the light guide plate.

Meanwhile, as one of demands for improvement of performance of the liquid crystal display apparatus, there is given enhancement of color reproducibility. In association with such demand, in recent years, quantum dots have been attracting attention as a light-emitting material, and a quantum dot film using the quantum dots has been marketed. When light from a backlight enters the quantum dot film, the quantum dots are excited to emit fluorescence. For example, when a blue LED backlight is used, the quantum dot film converts a part of blue light into red light and green light, and allows another part of the blue light to be output as it is as blue light. As a result, white light can be achieved. Further, it is said that color reproducibility at an NTSC ratio of 100% or more can be achieved through the use of such quantum dot film.

However, in a liquid crystal display apparatus using the back-surface side polarizing plate and the prism sheet in separate arrangement, even when the quantum dot film is used in combination, there is a problem in that its hue is not neutral and has a significant yellow tinge.

CITATION LIST

Patent Literature

[PTL 1] JP 2015-111518 A

SUMMARY OF INVENTION

Technical Problem

The present invention has been made in order to solve the problem of the related art described above, and an object of the present invention is to provide an optical member that can achieve a liquid crystal display apparatus that is excellent in mechanical strength, has an excellent hue, and shows little change in hue dependent on a viewing angle.

Solution to Problem

According to one aspect of the present invention, there is provided an optical member with a wavelength conversion layer, including: a wavelength conversion layer; a prism sheet; and an optically functional element, the wavelength conversion layer, the prism sheet, and the optically functional element being integrated in the stated order, in which the prism sheet has: a first main surface, which is flat; and a second main surface, on which a plurality of unit prisms each having a columnar shape convex toward an opposite side to the first main surface are arrayed, and in which convex portions formed by the plurality of unit prisms on the second main surface of the prism sheet are bonded to one main surface of the optically functional element.

In one embodiment, the optically functional element includes a reflective polarizer, and the convex portions formed by the plurality of unit prisms on the second main surface of the prism sheet are bonded to one main surface of the reflective polarizer.

In one embodiment, the optically functional element includes a polarizing plate, which includes an absorption-type polarizer, and the convex portions formed by the plurality of unit prisms on the second main surface of the prism sheet are bonded to one main surface of the polarizing plate.

In one embodiment, the optically functional element includes: a polarizing plate, which includes an absorption-type polarizer; and a reflective polarizer, and the convex portions formed by the plurality of unit prisms on the second main surface of the prism sheet are bonded to a main surface of the reflective polarizer on an opposite side to the polarizing plate.

In one embodiment, the optically functional element further includes a light diffusing layer on an opposite side of the reflective polarizer to the prism sheet.

In one embodiment, the optically functional element includes in this order from a prism sheet side: a light diffusing layer; a polarizing plate, which includes an absorption-type polarizer; and a reflective polarizer, and the convex portions formed by the plurality of unit prisms on the second main surface of the prism sheet are bonded to a main surface of the light diffusing layer on an opposite side to the polarizing plate.

In one embodiment, the optically functional element further includes a light diffusing layer between the polarizing plate and the reflective polarizer.

In one embodiment, the optical member with a wavelength conversion layer further includes a low-refractive index layer, which has a refractive index of 1.3 or less, between the wavelength conversion layer and the prism sheet.

In one embodiment, the optical member with a wavelength conversion layer further includes another prism sheet on an opposite side of the prism sheet to the optically functional element, the another prism sheet, the prism sheet, and the optically functional element being integrated with each other, the another prism sheet has: a first main surface, which is flat; and a second main surface, on which a plurality of unit prisms each having a columnar shape convex toward an opposite side to the first main surface are arrayed, and convex portions formed by the plurality of unit prisms on the second main surface of the another prism sheet are bonded to the first main surface of the prism sheet.

In one embodiment, the optical member with a wavelength conversion layer further includes a low-refractive index layer, which has a refractive index of 1.3 or less, between the wavelength conversion layer and the another prism sheet.

According to another aspect of the present invention, there is provided a polarizing plate set. The polarizing plate set includes: the optical member with a wavelength conversion layer, which is used as a back-surface side polarizing plate; and a viewer side polarizing plate.

According to still another aspect of the present invention, there is provided a liquid crystal display apparatus. The liquid crystal display apparatus includes: a liquid crystal cell; a viewer side polarizing plate, which is arranged on a viewer side of the liquid crystal cell; and the optical member with a wavelength conversion layer, which is arranged on an opposite side of the liquid crystal cell to the viewer side.

According to still another aspect of the present invention, there is provided a liquid crystal display apparatus. The liquid crystal display apparatus includes: a liquid crystal cell; a viewer side polarizing plate, which is arranged on a viewer side of the liquid crystal cell; and a wavelength conversion member and an optical member, which are arranged on an opposite side of the liquid crystal cell to the viewer side. The optical member includes an optically functional element and a prism sheet, the optically functional element and the prism sheet being integrated in the stated order from a liquid crystal cell side. The prism sheet has: a first main surface, which is flat; and a second main surface, on which a plurality of unit prisms each having a columnar shape convex toward an opposite side to the first main surface are arrayed. Convex portions formed by the plurality of unit prisms on the second main surface of the prism sheet are bonded to one main surface of the optically functional element.

In one embodiment, the optically functional element includes a reflective polarizer, and the convex portions formed by the plurality of unit prisms on the second main surface of the prism sheet are bonded to one main surface of the reflective polarizer.

In one embodiment, the optically functional element includes a polarizing plate, which includes an absorption-type polarizer, and the convex portions formed by the plurality of unit prisms on the second main surface of the prism sheet are bonded to one main surface of the polarizing plate.

In one embodiment, the optically functional element includes: a polarizing plate, which includes an absorption-type polarizer; and a reflective polarizer, and the convex portions formed by the plurality of unit prisms on the second main surface of the prism sheet are bonded to a main surface of the reflective polarizer on an opposite side to the polarizing plate.

In one embodiment, the optically functional element further includes a light diffusing layer on an opposite side of the reflective polarizer to the prism sheet.

In one embodiment, the optically functional element includes in this order from a prism sheet side: a light diffusing layer; a polarizing plate, which includes an absorption-type polarizer; and a reflective polarizer, and the convex portions formed by the plurality of unit prisms on the second main surface of the prism sheet are bonded to a main surface of the light diffusing layer on an opposite side to the polarizing plate.

In one embodiment, the optically functional element further includes a light diffusing layer between the polarizing plate and the reflective polarizer.

In one embodiment, the optical member further includes another prism sheet on an opposite side of the prism sheet to the optically functional element, the another prism sheet, the prism sheet, and the optically functional element being integrated with each other, the another prism sheet has: a first main surface, which is flat; and a second main surface, on which a plurality of unit prisms each having a columnar shape convex toward an opposite side to the first main surface are arrayed, and convex portions formed by the plurality of unit prisms on the second main surface of the another prism sheet are bonded to the first main surface of the prism sheet.

Advantageous Effects of Invention

According to the present invention, in the optical member in which the prism sheet and the optically functional element are integrated with each other, the convex portions formed by the unit prisms of the prism sheet and the predetermined flat surface of the optically functional element are bonded to each other, and thus the optical member capable of achieving a liquid crystal display apparatus that is excellent in mechanical strength, has an excellent hue, and shows little change in hue dependent on the viewing angle can be provided.

DESCRIPTION OF EMBODIMENTS

A. Entire Configuration of Optical Member

Figure 1:
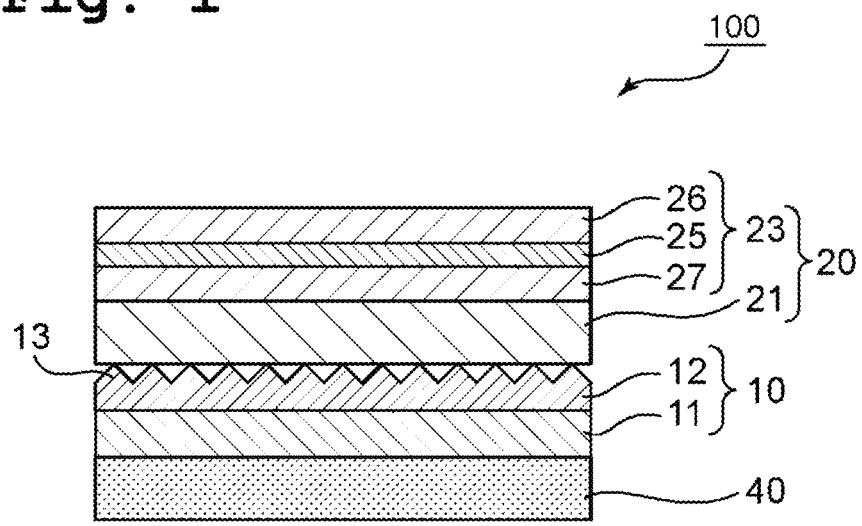
FIG. 1 is a schematic cross-sectional view for illustrating an optical member according to one embodiment of the present invention.

First, the entire configuration of an optical member according to a typical embodiment of the present invention is described with reference to the drawings. In the respective drawings, like constituent elements are denoted by like reference numerals, and overlapping description is omitted. In addition, for ease of viewing, a ratio among the thicknesses of layers in the drawings is different from an actual one. Constituent elements of the optical member are described in detail in the section B to the section H.

FIG. 1 is a schematic cross-sectional view for illustrating an optical member according to one embodiment of the present invention. An optical member 100 includes a prism sheet 10 and an optically functional element 20, which are integrated with each other. When the prism sheet is incorporated and integrated into the optical member as described above, an air layer between the prism sheet and a layer adjacent thereto can be eliminated, and hence a contribution can be made to the thinning of a liquid crystal display apparatus. The thinning of the liquid crystal display apparatus broadens the range of design choices, and hence has a high commercial value. Further, the integration of the prism sheet can prevent the prism sheet from being flawed due to friction during mounting of the prism sheet onto a surface light source device (a backlight unit, substantially a light guide plate), and hence can provide a liquid crystal display apparatus capable of preventing cloudiness of its display resulting from such flaw and excellent in mechanical strength.

The optically functional element 20 includes any appropriate optically functional layer and/or optical film depending on purposes. The optically functional layer may be a single layer or have a laminated structure. The optical film may also be a single film or be a laminated film. Specific examples of the optically functional layer and the optical film include a polarizing plate, a retardation layer or a retardation film, a reflective polarizer or a brightness enhancement film, a light diffusing layer or a light diffusing element, an index-matching layer (e.g., a low-refractive index layer or a high-refractive index layer), a conductive film, and a polymer-dispersed liquid crystal. The retardation layer or the retardation film may have any appropriate optical characteristics (e.g., refractive index characteristic, in-plane retardation, thickness direction retardation, Nz coefficient, and wavelength dispersion characteristic) depending on purposes. The optically functional element 20 typically includes the polarizing plate, the reflective polarizer, or a combination thereof. In the illustrated example, there is illustrated an embodiment in which the optically functional element 20 includes a reflective polarizer 21 and a polarizing plate 23 in the stated order from the prism sheet side. However, any one of the reflective polarizer 21 and the polarizing plate 23 may be absent. The polarizing plate 23 typically includes an absorption-type polarizer 25, a protective layer 26 arranged on one side of the absorption-type polarizer 25, and a protective layer 27 arranged on the other side of the absorption-type polarizer 25.

The prism sheet 10 typically includes a substrate portion 11 and a prism portion 12. The prism sheet 10 has a flat first main surface (flat surface of the substrate portion 11) and a second main surface having an uneven shape on the opposite side to the first main surface (surface having convex portions formed by a plurality of columnar unit prisms 13 arrayed on the opposite side to the first main surface). In the embodiment of the present invention, convex portions formed by the unit prisms 13 on the second main surface of the prism sheet 10 are bonded to one main surface of the optically functional element 20. In the illustrated example, the convex portions formed by the unit prisms 13 on the second main surface of the prism sheet 10 are bonded to the main surface of the reflective polarizer 21 on the opposite side to the polarizing plate 23. As a result, a void portion is defined between each of concave portions on the second main surface of the prism sheet 10 and the optically functional element 20 (in the illustrated example, the reflective polarizer 21). With such configuration, when the optical member is applied to a liquid crystal display apparatus, an excellent hue and suppression of a change in hue depending on a viewing angle can be simultaneously achieved. Herein, such adhesion of the prism sheets (substantially the unit prisms) only at the convex portions is sometimes referred to as "point adhesion" for convenience. When the optical member is used in combination with a wavelength conversion layer to be described later, the effect of the point adhesion becomes remarkable. In particular, the hue (problem of a yellow tinge) of the liquid crystal display apparatus can be remarkably improved when the optical member is used in combination with the wavelength conversion layer. The details are as described below. The wavelength conversion layer to be applied to a liquid crystal display apparatus converts a part of incident light having a blue to bluish purple color into green light and red light, and outputs another part thereof as it is as blue light, to thereby achieve white light by the combination of the red light, the green light, and the blue light. In addition, in many cases, the wavelength conversion layer to be applied to a liquid crystal display apparatus has a yellow to orange color in association with its constituent material and light absorption. A prism sheet is typically used for enhancing brightness and a hue by the compensation of color conversion efficiency, which is insufficient with the wavelength conversion layer alone, through the utilization of its retroreflection. However, the probability of occurrence of retroreflection and optical path length in a front direction are different from those in an oblique direction. The hue in the oblique direction looks from green to orange, red, or the like owing to excessive conversion of blue light as compared to that in the front direction, resulting in a reduction in display quality of an image display apparatus in many cases. According to the embodiment of the present invention, through the adoption of the point adhesion, an air layer is eliminated at each of the portions subjected to the point adhesion to change the spread of light and the probability of retroreflection, and hence light advancing in the front direction is increased as compared to that in a configuration in which the prism sheet is merely placed (separately arranged). As a result, the hue balance in each of the front and oblique directions (in particular, the oblique direction) can be improved. Further, through the adjustment of the degree of the point adhesion (e.g., the number of the portions subjected to the point adhesion, the positions thereof, and the thickness of an adhesive to be used for the point adhesion), desired brightness and hue balances can be achieved in both the front and oblique directions. Besides, when void portions having a predetermined voidage are formed through the adjustment of the degree of the point adhesion, more excellent brightness and a more excellent hue can be achieved.

The optical member 100 may further include, as required, a wavelength conversion layer 40 (wavelength conversion member) on the opposite side of the prism sheet 10 to the optically functional element 20 as in the illustrated example. The wavelength conversion layer 40 may be integrated into the optical member 100 (that is, the wavelength conversion layer 40, the prism sheet 10, and the optically functional element 20 may be integrated with each other), or may not be integrated thereinto. In the following description, in order to distinguish from the optical member not having the wavelength conversion layer integrated thereinto, the optical member having the wavelength conversion layer integrated thereinto is sometimes referred to as "optical member with a wavelength conversion layer." In addition, the wavelength conversion layer 40 may be arranged on the upper side (i.e., viewer side) of the prism sheet 10. For example, when the wavelength conversion layer 40 is applied to a liquid crystal display apparatus, the wavelength conversion layer 40 may be arranged on the opposite side of the prism sheet 10 to a backlight unit, or the wavelength conversion layer 40 may be incorporated into a liquid crystal cell. The arrangement of the wavelength conversion layer makes the effect of the point adhesion remarkable. In addition, the arrangement of the wavelength conversion layer can satisfactorily suppress display unevenness when the optical member is applied to a liquid crystal display apparatus.

Figure 2:
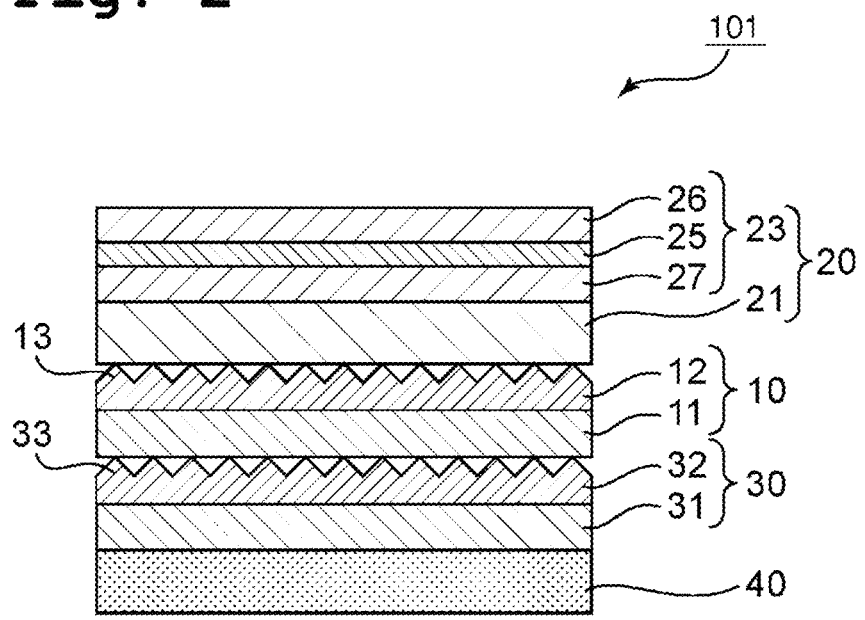
FIG. 2 is a schematic cross-sectional view for illustrating an optical member according to another embodiment of the present invention.

FIG. 2 is a schematic cross-sectional view for illustrating an optical member according to another embodiment of the present invention. An optical member 101 further includes another prism sheet 30 on the opposite side of the prism sheet 10 to the optically functional element 20. For convenience, the prism sheet 10 is hereinafter sometimes referred to as "first prism sheet", and the other prism sheet 30 is hereinafter sometimes referred to as "second prism sheet". In this embodiment, the second prism sheet 30, the prism sheet 10, and the optically functional element 20 are integrated with each other. In addition, the wavelength conversion layer 40 is arranged on the opposite side of the second prism sheet 30 to the first prism sheet 10. The second prism sheet 30 typically includes a substrate portion 31 and a prism portion 32. The second prism sheet 30 has a flat first main surface (flat surface of the substrate portion 31) and a second main surface having an uneven shape on the opposite side to the first main surface (surface having convex portions formed by a plurality of columnar unit prisms 33 arrayed on the opposite side to the first main surface). In this embodiment, convex portions formed by the unit prisms 33 on the second main surface of the second prism sheet 30 are bonded to the first main surface of the first prism sheet 10. That is, the second prism sheet 30 is subjected to the point adhesion to the first prism sheet 10. As a result, a void portion is defined between each of concave portions on the second main surface of the second prism sheet 30 and the first prism sheet 10.

In one embodiment, the optical member may further include a light diffusing layer (not shown). In each of the embodiments illustrated in FIG. 1 and FIG. 2, the light diffusing layer may be arranged between the reflective polarizer 21 and the polarizing plate 23. In an embodiment in which the polarizing plate 23 is absent, the light diffusing layer may be arranged on the opposite side of the reflective polarizer 21 to the first prism sheet 10. In an embodiment in which the reflective polarizer 21 is absent, the light diffusing layer may be arranged on the first prism sheet 10 side of the polarizing plate 23. In addition, the optical member may further include, as required, a barrier layer (not shown) adjacent to the wavelength conversion layer 40 on at least one side of the wavelength conversion layer 40. In the embodiment illustrated in FIG. 1, the barrier layer may be arranged between the prism sheet 10 and the wavelength conversion layer 40, and/or on the opposite side of the wavelength conversion layer 40 to the prism sheet 10. In the embodiment illustrated in FIG. 2, the barrier layer may be arranged between the second prism sheet 30 and the wavelength conversion layer 40, and/or on the opposite side of the wavelength conversion layer 40 to the second prism sheet 30.

In one embodiment, the optical member may further include a low-refractive index layer (not shown). The low-refractive index layer may be typically arranged between the first prism sheet 10 and the reflective polarizer 21 (when the reflective polarizer 21 is absent, the polarizing plate 23), and/or between the first prism sheet 10 (or the second prism sheet 30) and the wavelength conversion layer 40 (when the barrier layer is arranged between the first or second prism sheet and the wavelength conversion layer, between the first or second prism sheet and the barrier layer).

In one embodiment, the optical member of the present invention may have an elongate shape. That is, each constituent element of the optical member may have an elongate shape as well. The optical member having an elongate shape can be produced by a roll-to-roll process, and hence is excellent in production efficiency.

The constituent elements of the optical member may be laminated through intermediation of any appropriate adhesion layer (e.g., an adhesive layer or a pressure-sensitive adhesive layer: not shown).

The above-mentioned embodiments may be appropriately combined, and modifications obvious in the art may be made to the constituent elements in the above-mentioned embodiments.

B. Prism Sheets

B-1. First Prism Sheet

As described above, the first prism sheet 10 typically includes the substrate portion 11 and the prism portion 12. When the optical member of the present invention is arranged on the backlight side of a liquid crystal display apparatus, the first prism sheet 10 guides polarized light, which has been output from the backlight unit, as polarized light having the maximum intensity in an approximately normal direction of the liquid crystal display apparatus to the polarizing plate by means of, for example, total reflection in the prism portion 12 while maintaining the polarization state of the light. The substrate portion 11 may be absent depending on purposes and the configuration of the prism sheet. For example, when the layer adjacent to the substrate portion side of the first prism sheet can function as a supporting member, the substrate portion 11 may be absent. The term "approximately normal direction" comprehends a direction at a predetermined angle with respect to a normal direction, for example, a direction at an angle in the range of ±10° with respect to the normal direction.

B-1-1. Prism Portion

In one embodiment, as described above, the first prism sheet 10 (substantially the prism portion 12) includes an array of the plurality of columnar unit prisms 13, which are convex toward an opposite side to the first main surface, in a parallel manner. Each of the unit prisms 13 is preferably columnar, and its lengthwise direction (edge line direction) is directed toward a direction approximately perpendicular, or a direction approximately parallel, to the transmission axis of the polarizing plate. In this specification, the expressions "substantially perpendicular" and "approximately perpendicular" include a case in which an angle formed by two directions is 90°±10°, and the angle is preferably 90°±7°, more preferably 90°±5°. The expressions "substantially parallel" and "approximately parallel" include a case in which an angle formed by two directions is 0°±10°, and the angle is preferably 0°±7°, more preferably 0°±5°. Moreover, in this specification, such a simple expression "perpendicular" or "parallel" may include a substantially perpendicular state or a substantially parallel state. The first prism sheet 10 may be arranged so that the edge line direction of each of the unit prisms 13 and the transmission axis of the polarizing plate form a predetermined angle (the so-called oblique arrangement). The adoption of such configuration can prevent the occurrence of the moire in a more satisfactory manner in some cases. The range of the oblique arrangement is preferably 20° or less, more preferably 15° or less.

Any appropriate configuration may be adopted as the shape of each of the unit prisms 13 as long as the effect of the present invention is obtained. The shape of a section of each of the unit prisms 13 parallel to its arrangement direction and parallel to its thickness direction may be a triangular shape or may be any other shape (e.g., such a shape that one of, or each of both, the inclined planes of a triangle has a plurality of flat surfaces having different tilt angles). The triangular shape may be a shape asymmetric with respect to a straight line passing the apex of the unit prism and perpendicular to the surface of the sheet (e.g., a scalene triangle), or may be a shape symmetric with respect to the straight line (e.g., an isosceles triangle). Further, the apex of the unit prism may be of a chamfered curved surface shape, or may be of a shape whose section is a trapezoid, the shape being obtained by such cutting that its tip becomes a flat surface. Detailed shapes of the unit prisms 13 may be appropriately set depending on purposes. For example, a configuration described in JP 11-84111 A may be adopted for each of the unit prisms 13.

All the unit prisms 13 may have the same height, or the unit prisms may have different heights. When the unit prisms have different heights, in one embodiment, the unit prisms have two heights. With such configuration, only unit prisms each having the larger height can be subjected to the point adhesion, and hence the point adhesion can be achieved to a desired degree by adjusting the positions and number of the unit prisms each having the larger height. For example, a unit prism having the larger height and a unit prism having the smaller height may be alternately arranged, a unit prism having the larger (or smaller) height may be arranged for, for example, every three, four, or five unit prisms, the unit prisms may be irregularly arranged depending on purposes, or the unit prisms may be completely randomly arranged. In another embodiment, the unit prisms have three or more heights. With such configuration, the degree to which the unit prisms to be subjected to the point adhesion are buried in the adhesive can be adjusted, and as a result, the point adhesion can be achieved to a more precise degree.

B-1-2. Substrate Portion

When the substrate portion 11 is arranged in the first prism sheet 10, the substrate portion 11 and the prism portion 12 may be integrally formed by, for example, subjecting a single material to extrusion, or the prism portion may be shaped on a film for the substrate portion. The thickness of the substrate portion is preferably from 25 μm to 150 μm. With such thickness, the handling property and strength of the prism sheet can be excellent.

Any appropriate material may be adopted as a material for forming the substrate portion 11 depending on purposes and the configuration of the prism sheet. When the prism portion is shaped on the film for the substrate portion, the film for the substrate portion is specifically, for example, a film formed of cellulose triacetate (TAC), a (meth)acrylic resin, such as polymethyl methacrylate (PMMA), or a polycarbonate (PC) resin. The film is preferably an unstretched film.

When the substrate portion 11 and the prism portion 12 are integrally formed of a single material, the same material as a material for forming the prism portion when the prism portion is shaped on the film for the substrate portion can be used as the material. Examples of the material for forming the prism portion include epoxy acrylate- and urethane acrylate-based reactive resins (e.g., an ionizing radiation-curable resin). When the prism sheet of an integral configuration is formed, PC, a polyester resin, such as PET, an acrylic resin, such as PMMA or MS, or an optically transparent thermoplastic resin, such as cyclic polyolefin, can be used.

The substrate portion 11 preferably substantially has optical isotropy. The phrase "substantially has optical isotropy" as used herein means that a retardation value is so small as to have substantially no influences on the optical characteristics of the liquid crystal display apparatus. For example, an in-plane retardation Re of the substrate portion is preferably 20 nm or less, more preferably 10 nm or less. The in-plane retardation Re is an in-plane retardation value measured with light having a wavelength of 590 nm at 23° C. The in-plane retardation Re is expressed by $Re=(nx-ny) \times d$. In the equation, nx represents a refractive index in a direction in which a refractive index becomes maximum in the plane of the optical member (i.e., a slow axis direction), ny represents a refractive index in a direction perpendicular to the slow axis in the plane (i.e., a fast axis direction), and d represents the thickness (nm) of the optical member.

Further, the substrate portion 11 has a photoelastic coefficient of preferably from $-10 \times 10^{-12}$ m²/N to $10 \times 10^{-12}$ m²/N, more preferably from $-5 \times 10^{-12}$ m²/N to $5 \times 10^{-12}$ m²/N, still more preferably from $-3 \times 10^{-12}$ m²/N to $3 \times 10^{-12}$ m²/N.

B-2. Second Prism Sheet

In the embodiment of the present invention, as illustrated in FIG. 2, the first prism sheet 10 and the second prism sheet 30 may be bonded to each other by the point adhesion. With such configuration, when the optical member is applied to a liquid crystal display apparatus, a liquid crystal display apparatus having more excellent brightness can be achieved. The configuration, function, and the like of the second prism sheet areas described in the section B-1 regarding the first prism sheet.

C. Reflective Polarizer

The reflective polarizer 21 has a function of transmitting polarized light in a specific polarization state (polarization direction) and reflecting light in a polarization state other than the foregoing. The reflective polarizer 21 may be of a linearly polarized light separation type or may be of a circularly polarized light separation type. Description is hereinafter given by taking the linearly polarized light separation-type reflective polarizer as an example. The circularly polarized light separation-type reflective polarizer is, for example, a laminate of a film obtained by fixing a cholesteric liquid crystal and a λ/4 plate.

Figure 3:
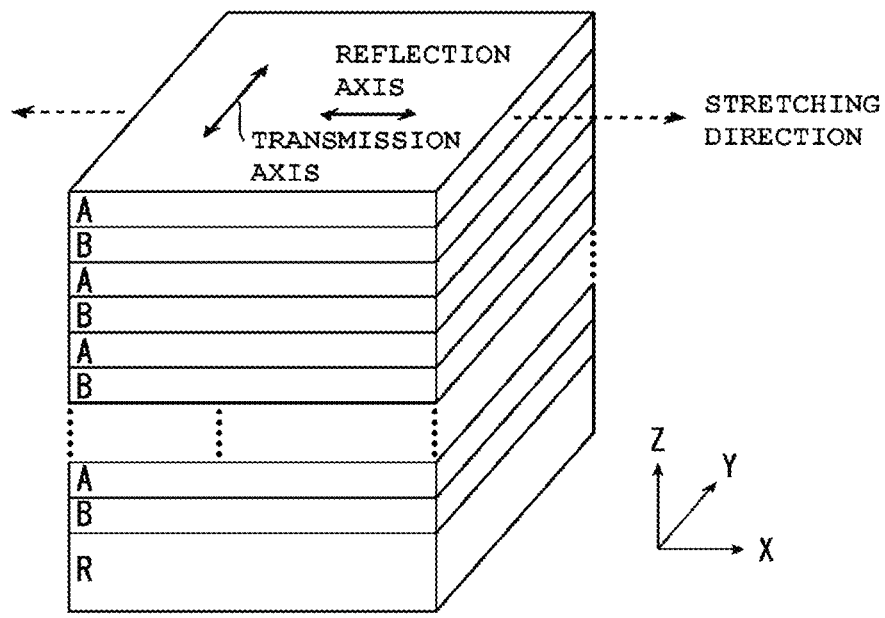
FIG. 3 is a schematic perspective view of an example of a reflective polarizer that may be used for the optical member of the present invention.

FIG. 3 is a schematic perspective view of an example of a reflective polarizer. The reflective polarizer is a multilayer laminate obtained by alternately laminating a layer A having birefringence and a layer B substantially free of birefringence. For example, the total number of the layers of such multilayer laminate can be from 50 to 1,000. In the illustrated example, a refractive index nx in the x-axis direction of the A layer is larger than a refractive index ny in the y-axis direction thereof, and a refractive index nx in the x-axis direction of the B layer and a refractive index ny in the y-axis direction thereof are substantially equal to each other. Therefore, a refractive index difference between the A layer and the B layer is large in the x-axis direction, and is substantially zero in the y-axis direction. As a result, the x-axis direction serves as a reflection axis and the y-axis direction serves as a transmission axis. The refractive index difference between the A layer and the B layer in the x-axis direction is preferably from 0.2 to 0.3. The x-axis direction corresponds to the stretching direction of the reflective polarizer in a method of producing the reflective polarizer.

The A layer is preferably formed of a material that expresses birefringence when stretched. Typical examples of such material include naphthalene dicarboxylic acid polyester (e.g., polyethylene naphthalate), polycarbonate, and an acrylic resin (e.g., polymethylmethacrylate). Of those, the polyethylene naphthalate is preferred. The B layer is preferably formed of a material that is substantially free of expressing birefringence even when stretched. Such material is typically, for example, a copolyester of naphthalene dicarboxylic acid and terephthalic acid.

The reflective polarizer transmits light having a first polarization direction (e.g., a p-wave) and reflects light having a second polarization direction perpendicular to the first polarization direction (e.g., a s-wave) at an interface between the A layer and the B layer. Part of the reflected light passes as light having the first polarization direction through the interface between the A layer and the B layer, and the other part thereof is reflected as light having the second polarization direction at the interface. Such reflection and transmission are repeated many times in the reflective polarizer, and hence the utilization efficiency of light can be improved.

In one embodiment, the reflective polarizer may include a reflective layer R as the outermost layer on an opposite side to the polarizing plate 23 as illustrated in FIG. 3. Light that has finally returned to the outermost portion of the reflective polarizer without being utilized can be further utilized by arranging the reflective layer R, and hence the utilization efficiency of the light can be further improved. The reflective layer R typically expresses a reflecting function by virtue of the multilayer structure of a polyester resin layer.

The total thickness of the reflective polarizer may be appropriately set depending on, for example, purposes and the total number of the layers in the reflective polarizer. The total thickness of the reflective polarizer is preferably from 10 μm to 150 μm.

In one embodiment, in the optical member 100, the reflective polarizer 21 is arranged so as to transmit light having a polarization direction parallel to the transmission axis of the polarizing plate 23. That is, the reflective polarizer 21 is arranged so that its transmission axis is in a direction approximately parallel to the direction of the transmission axis of the polarizing plate 23. With such configuration, light to be absorbed by the polarizing plate 23 can be recycled, the utilization efficiency can be further improved, and the brightness can be improved.

The reflective polarizer can be typically produced by combining co-extrusion and lateral stretching. The co-extrusion may be performed by any appropriate system. For example, the system may be a feed block system or may be a multi-manifold system. For example, a material for forming the A layer and a material for forming the B layer are extruded in a feed block, and are then formed into a plurality of layers with a multiplier. Such apparatus for forming the materials into a plurality of layers is known to one skilled in the art. Next, the resultant long multilayer laminate is typically stretched in a direction (TD) perpendicular to its conveying direction. The material for forming the A layer (e.g., polyethylene naphthalate) is increased in refractive index only in the stretching direction by the lateral stretching, and as a result, expresses birefringence. The material for forming the B layer (e.g., the copolyester of naphthalene dicarboxylic acid and terephthalic acid) is not increased in refractive index in any direction even by the lateral stretching. As a result, a reflective polarizer having a reflection axis in the stretching direction (TD) and having a transmission axis in the conveying direction (MD) can be obtained (the TD corresponds to the x-axis direction of FIG. 3 and the MD corresponds to the y-axis direction thereof). A stretching operation may be performed with any appropriate apparatus.

A polarizer described in, for example, JP 09-507308 A may be used as the reflective polarizer.

A commercial product may be used as it is as the reflective polarizer, or the commercial product may be subjected to secondary processing (e.g., stretching) before use. The commercial product is, for example, a product available under the product name "DBEF" from 3M Company, or a product available under the product name "APF" from 3M Company.

The reflective polarizer 21 is bonded to the polarizing plate 23 through intermediation of any appropriate adhesion layer (e.g., an adhesive layer or a pressure-sensitive adhesive layer: not shown).

D. Polarizing Plate

As described above, the polarizing plate 23 typically includes the absorption-type polarizer 25, the protective layer 26 arranged on one side of the absorption-type polarizer 25, and the protective layer 27 arranged on the other side of the absorption-type polarizer 25.

D-1. Polarizer

Any appropriate polarizer may be adopted as the absorption-type polarizer 25. For example, a resin film for forming the polarizer may be a single-layer resin film, or may be a laminate of two or more layers.

Specific examples of the polarizer including a single-layer resin film include: a polarizer obtained by subjecting a hydrophilic polymer film, such as a polyvinyl alcohol (PVA)-based film, a partially formalized PVA-based film, or an ethylene-vinyl acetate copolymer-based partially saponified film, to dyeing treatment with a dichroic substance, such as iodine or a dichroic dye, and stretching treatment; and a polyene-based alignment film, such as a dehydration-treated product of PVA or a dehydrochlorination-treated product of polyvinyl chloride. A polarizer obtained by dyeing the PVA-based film with iodine and uniaxially stretching the resultant is preferably used because the polarizer is excellent in optical characteristics.

The dyeing with iodine is performed by, for example, immersing the PVA-based film in an aqueous solution of iodine. The stretching ratio of the uniaxial stretching is preferably from 3 times to 7 times. The stretching may be performed after the dyeing treatment, or may be performed while the dyeing is performed. In addition, the dyeing may be performed after the stretching has been performed. The PVA-based film is subjected to swelling treatment, cross-linking treatment, washing treatment, drying treatment, or the like as required. For example, when the PVA-based film is immersed in water to be washed with water before the dyeing, contamination or an antiblocking agent on the surface of the PVA-based film can be washed off. In addition, the PVA-based film is swollen and hence dyeing unevenness or the like can be prevented.

The polarizer obtained by using the laminate is specifically, for example, a polarizer obtained by using a laminate of a resin substrate and a PVA-based resin layer (PVA-based resin film) laminated on the resin substrate, or a laminate of a resin substrate and a PVA-based resin layer formed on the resin substrate through application. The polarizer obtained by using the laminate of the resin substrate and the PVA-based resin layer formed on the resin substrate through application may be produced by, for example, a method involving: applying a PVA-based resin solution to the resin substrate; drying the solution to form the PVA-based resin layer on the resin substrate, thereby providing the laminate of the resin substrate and the PVA-based resin layer; and stretching and dyeing the laminate to turn the PVA-based resin layer into the polarizer. In this embodiment, the stretching typically includes the stretching of the laminate under a state in which the laminate is immersed in an aqueous solution of boric acid. The stretching may further include the aerial stretching of the laminate at high temperature (e.g., 95° C. or more) before the stretching in the aqueous solution of boric acid as required. The resultant laminate of the resin substrate and the polarizer may be used as it is (i.e., the resin substrate may be used as a protective layer for the polarizer). Alternatively, a product obtained as described below may be used: the resin substrate is peeled from the laminate of the resin substrate and the polarizer, and any appropriate protective layer in accordance with purposes is laminated on the peeling surface. Details of such method of producing a polarizer are described in, for example, JP 2012-73580 A. The entire description of the laid-open publication is incorporated herein by reference.

The thickness of the polarizer is preferably 15 µm or less, more preferably from 1 µm to 12 µm, still more preferably from 3 µm to 12 µm, particularly preferably from 3 µm to 8 µm. When the thickness of the polarizer falls within such range, curling at the time of heating can be satisfactorily suppressed, and besides, satisfactory external appearance durability at the time of heating is obtained.

The polarizer preferably shows absorption dichroism at any wavelength in the wavelength range of from 380 nm to 780 nm. The single layer transmittance of the polarizer is from 43.0% to 46.0% as described above, preferably from 44.5% to 46.0%. The polarization degree of the polarizer is preferably 97.0% or more, more preferably 99.0% or more, still more preferably 99.9% or more.

The single layer transmittance and polarization degree described above may be measured with a spectrophotometer. A specific measurement method for the polarization degree described above may involve measuring the parallel transmittance ($H_0$) and perpendicular transmittance ($H_{90}$) of the polarizer, and determining the polarization degree through the following expression: polarization degree (%)=$\{(H_0-H_{90})/(H_0+H_{90})\}^{1/2} \times 100$. The parallel transmittance ($H_0$) described above refers to a value of a transmittance of a parallel-type laminated polarizer manufactured by causing two identical polarizers to overlap with each other so that absorption axes thereof are parallel to each other. In addition, the perpendicular transmittance ($H_{90}$) described above refers to a value of a transmittance of a perpendicular-type laminated polarizer manufactured by causing two identical polarizers to overlap with each other so that absorption axes thereof are perpendicular to each other. Each of those transmittances is a Y value obtained through visibility correction with the two-degree field of view (C light source) of JIS Z 8701-1982.

D-2. Protective Layer

The protective layer is formed of any appropriate film that may be used as a protective film for the polarizing plate. Specific examples of a material serving as a main component of the film include transparent resins, such as a cellulose-based resin, such as triacetylcellulose (TAC), a polyester-based resin, a polyvinyl alcohol-based resin, a polycarbonate-based resin, a polyamide-based resin, a polyimide-based resin, a polyether sulfone-based resin, a polysulfone-based resin, a polystyrene-based resin, a polynorbornene-based resin, a polyolefin-based resin, a (meth)acrylic resin, and an acetate-based resin. Another example thereof is a thermosetting resin or a UV-curable resin, such as a (meth)acrylic resin, a urethane-based resin, a (meth)acrylic urethane-based resin, an epoxy-based resin, or a silicone-based resin. Still another example thereof is a glassy polymer, such as a siloxane-based polymer. Further, a polymer film described in JP 2001-343529 A (WO 01/37007 A1) may also be used. As a material for the film, for example, there may be used a resin composition containing: a thermoplastic resin having a substituted or unsubstituted imide group in a side chain; and a thermoplastic resin having a substituted or unsubstituted phenyl group and a nitrile group in side chains. An example thereof is a resin composition containing an alternate copolymer formed of isobutene and N-methylmaleimide, and an acrylonitrile-styrene copolymer. The polymer film may be an extruded product of the resin composition, for example. The protective layers 26 and 27 may be identical to or different from each other.

The thickness of each of the protective layers is preferably from 20 µm to 100 µm. Each of the protective layers may be laminated on the polarizer through intermediation of an adhesion layer (specifically an adhesive layer or a pressure-sensitive adhesive layer), or may be laminated so as to be in close contact with the polarizer (without through the adhesion layer). The adhesive layer is formed of any appropriate adhesive. The adhesive is, for example, a water-soluble adhesive using a polyvinyl alcohol-based resin as a main component. The water-soluble adhesive using the polyvinyl alcohol-based resin as a main component can preferably further contain a metal compound colloid. The metal compound colloid can be such that metal compound fine particles are dispersed in a dispersion medium, and the colloid can be a colloid that electrostatically stabilizes as a result of interactive repulsion between the charges of the same kind of the fine particles to permanently have stability. The average particle diameter of the fine particles forming the metal compound colloid may be any appropriate value as long as the average particle diameter does not adversely affect the optical characteristics of the polarizer, such as a polarization characteristic. The average particle diameter is preferably from 1 nm to 100 nm, more preferably from 1 nm to 50 nm. This is because the fine particles can be uniformly dispersed in the adhesive layer, its adhesion can be secured, and a knick can be suppressed. The term. "knick" refers to a local uneven defect that occurs at an interface between the polarizer and each of the protective layers.

E. Wavelength Conversion Layer

The wavelength conversion layer 40 typically includes a matrix and a wavelength conversion material dispersed in the matrix.

E-1. Matrix

Any appropriate material may be used as a material for forming the matrix (hereinafter sometimes referred to as "matrix material"). Examples of such material include a resin, an organic oxide, and an inorganic oxide. It is preferred that the matrix material have low oxygen permeability and low moisture permeability, have high light stability and high chemical stability, have a predetermined refractive index, have excellent transparency, and/or have excellent dispersibility of the wavelength conversion material. In practical use, the matrix may be formed of a resin film or a pressure-sensitive adhesive.

E-1-1. Resin Film

When the matrix is the resin film, any appropriate resin may be used as a resin for forming the resin film. Specifically, the resin may be a thermoplastic resin, may be a thermosetting resin, or may be an active energy ray-curable resin. Examples of the active energy ray-curable resin include an electron beam-curable resin, a UV-curable resin, and a visible ray-curable resin. Specific examples of the resin include an epoxy, a (meth)acrylate (e.g., methyl methacrylate or butyl acrylate), norbornene, polyethylene, poly (vinyl butyral), poly(vinyl acetate), polyurea, polyurethane, amino silicone (AMS), polyphenylmethylsiloxane, polyphenylalkylsiloxane, polydiphenylsiloxane, polydialkylsiloxane, silsesquioxane, silicone fluoride, vinyl and hydrogenated product-substituted silicone, a styrene-based polymer (e.g., polystyrene, amino polystyrene (APS), or poly (acrylonitrile ethylene styrene) (AES)), a polymer cross-linked with a bifunctional monomer (e.g., divinylbenzene), a polyester-based polymer (e.g., polyethylene terephthalate), a cellulose-based polymer (e.g., triacetylcellulose), a vinyl chloride-based polymer, an amide-based polymer, an imide-based polymer, a vinyl alcohol-based polymer, an epoxy-based polymer, a silicone-based polymer, and an acrylic urethane-based polymer. Those resins may be used alone or in combination thereof (e.g., a blend or a copolymer). After any such resin has been formed into a film, the film may be subjected to treatment, such as stretching, heating, or pressurization. Of those, a thermosetting resin or a UV-curable resin is preferred, and a thermosetting resin is more preferred. This is because such resin can be suitably applied to a case in which the optical member of the present invention is produced by a roll-to-roll process.

E-1-2. Pressure-Sensitive Adhesive

When the matrix is the pressure-sensitive adhesive, any appropriate pressure-sensitive adhesive may be used as the pressure-sensitive adhesive. The pressure-sensitive adhesive preferably has transparency and optical isotropy. Specific examples of the pressure-sensitive adhesive include a rubber-based pressure-sensitive adhesive, an acrylic pressure-sensitive adhesive, a silicone-based pressure-sensitive adhesive, an epoxy-based pressure-sensitive adhesive, and a cellulose-based pressure-sensitive adhesive. Of those, a rubber-based pressure-sensitive adhesive or an acrylic pressure-sensitive adhesive is preferred.

E-2. Wavelength Conversion Material

The wavelength conversion material can control the wavelength conversion characteristic of the wavelength conversion layer. The wavelength conversion material may be, for example, quantum dots or a phosphor.

The content of the wavelength conversion material (when two or more kinds are used, the total content thereof) in the wavelength conversion layer is preferably from 0.01 part by weight to 50 parts by weight, more preferably from 0.01 part by weight to 30 parts by weight with respect to 100 parts by weight of the matrix material (typically, the solid content of the resin or the pressure-sensitive adhesive). When the content of the wavelength conversion material falls within such range, a liquid crystal display apparatus excellent in balance among all the RGB hues can be achieved.

E-2-1. Quantum Dots

The center emission wavelength of each of the quantum dots may be adjusted on the basis of, for example, the material and/or composition, particle size, and shape of each of the quantum dots.

The quantum dots may each be formed of any appropriate material. The quantum dots may each be formed of preferably an inorganic material, more preferably an inorganic conductor material or an inorganic semiconductor material. Examples of the semiconductor material include semiconductors of Groups II-VI, Groups III-V, Groups IV-VI, and Group IV. Specific examples thereof include Si, Ge, Sn, Se, Te, B, C (including diamond), P, BN, BP, BAs, AlN, AlP, AlAs, AlSb, GaN, GaP, GaAs, GaSb, InN, InP, InAs, InSb, ZnO, ZnS, ZnSe, ZnTe, CdS, CdSe, CdSeZn, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, $(Al, Ga, In)_2(S, Se, Te)_3$, and $Al_2CO$. Those semiconductor materials may be used alone or in combination thereof. The quantum dots may each contain a p-type dopant or an n-type dopant. In addition, the quantum dots may each have a core-shell structure. In the core-shell structure, any appropriate functional layer (a single layer or a plurality of layers) may be formed on the periphery of a shell depending on purposes, or the surface of the shell may be subjected to surface treatment and/or chemical modification.

Any appropriate shape may be adopted as the shape of each of the quantum dots depending on purposes. Specific examples thereof include a true spherical shape, a flaky shape, a plate-like shape, an ellipsoidal shape, and an amorphous shape.

Any appropriate size may be adopted as the size of each of the quantum dots depending on a desired emission wavelength. The size of each of the quantum dots is preferably from 1 nm to 10 nm, more preferably from 2 nm to 8 nm. When the size of each of the quantum dots falls within such range, sharp emission is shown for each of green light and red light, and a high color rendering property can be achieved. For example, green light can be emitted when the quantum dots each have a size of about 7 nm, and red light can be emitted when the quantum dots each have a size of about 3 nm. When the quantum dots each have, for example, a true spherical shape, the size of each of the quantum dots is the average particle diameter, and when the quantum dots each have any other shape, the size is a dimension along the shortest axis in the shape.

Details of the quantum dots are described in, for example, JP 2012-169271 A, JP 2015-102857 A, JP 2015-65158 A, JP 2013-544018 A, and JP 2010-533976 A, and description of those publications is incorporated herein by reference. Commercially available products may be used as the quantum dots.

E-2-2. Phosphor

Any appropriate phosphor capable of emitting light of a desired color depending on purposes may be used as the phosphor. Specific examples thereof include a red phosphor and a green phosphor.

An example of the red phosphor is a complex fluoride phosphor activated with $Mn^{4+}$. The complex fluoride phosphor refers to a coordination compound containing at least one coordination center (e.g., M to be described later) surrounded by fluoride ions acting as ligands, in which, as required, electric charge is compensated for by a counterion (e.g., A to be described later). Specific examples thereof include $A_2[MF_5]:Mn^{4+}$, $A_3[MF_6]:Mn^{4+}$, $Zn_2[MF_7]:Mn^{4+}$, $A[In_2F_7]:Mn^{4+}$, $A_2[M'F_6]:Mn^{4+}$, $E[M'F_6]:Mn^{4+}$, $A_3[ZrF_7]:Mn^{4+}$, and $Ba_{0.65}Zr_{0.35}F_{2.70}:Mn^{4+}$. In the formulae, A represents Li, Na, K, Rb, Cs, or $NH_4$, or a combination thereof. M represents Al, Ga, or In, or a combination thereof. M' represents Ge, Si, Sn, Ti, or Zr, or a combination thereof. E represents Mg, Ca, Sr, Ba, or Zn, or a combination thereof. Of those, a complex fluoride phosphor having a coordination number at the coordination center of 6 is preferred. Details of such red phosphor are described in, for example, JP 2015-84327 A. The entire description of the laid-open publication is incorporated herein by reference.

An example of the green phosphor is a compound containing, as a main component, a solid solution of SiAlON having a $\beta$-$Si_3N_4$ crystal structure. Treatment for adjusting the amount of oxygen contained in such SiAlON crystal to a specific amount (e.g., 0.8 mass %) or less is preferably performed. When such treatment is performed, a green phosphor capable of emitting sharp light with a small peak width can be obtained. Details of such green phosphor are described in, for example, JP 2013-28814 A. The entire description of the laid-open publication is incorporated herein by reference.

The wavelength conversion layer may be a single layer, or may have a laminated structure. When the wavelength conversion layer has a laminated structure, its layers may typically contain wavelength conversion materials having light emission characteristics different from each other.

The thickness of the wavelength conversion layer (when the wavelength conversion layer has a laminated structure, the total thickness thereof) is preferably from 1 µm to 500 µm, more preferably from 100 µm to 400 µm. When the thickness of the wavelength conversion layer falls within such range, the wavelength conversion layer can be excellent in conversion efficiency and durability. When the wavelength conversion layer has a laminated structure, the thickness of each of its layers is preferably from 1 µm to 300 µm, more preferably from 10 µm to 250 µm.

The water vapor transmission rate (moisture vapor transmission rate) of the wavelength conversion layer in terms of a thickness of 50 µm is preferably 100 g/m$^2$·day or less, more preferably 80 g/m$^2$·day or less. The water vapor transmission rate may be measured under an atmosphere at 40° C. and 90% RH by a measurement method in conformity to JIS K7129.

E-3. Barrier Function

Irrespective of whether the matrix is the resin film or the pressure-sensitive adhesive, the wavelength conversion layer preferably has a barrier function against oxygen and/or water vapor. The phrase "has a barrier function" as used herein means controlling the transmission amount of oxygen and/or water vapor penetrating into the wavelength conversion layer to substantially shield the wavelength conversion material therefrom. The wavelength conversion layer may express the barrier function by imparting, to the wavelength conversion material itself, a three-dimensional structure, such as a core-shell structure or a tetrapod-like structure. In addition, the wavelength conversion layer may express the barrier function through appropriate selection of the matrix material.

E-4. Others

The wavelength conversion layer may further contain any appropriate additive depending on purposes. Examples of the additive include a light diffusing material, a material for imparting anisotropy to light, and a material for polarizing light. Specific examples of the light diffusing material include fine particles each formed of an acrylic resin, a silicone-based resin, a styrene-based resin, or a resin based on a copolymer thereof. Specific examples of the material for imparting anisotropy to light and/or the material for polarizing light include: ellipsoidal fine particles in each of which birefringence on its major axis differs from that on its minor axis; core-shell type fine particles; and laminated fine particles. The kind, number, blending amount, and the like of the additives may be appropriately set depending on purposes.

The wavelength conversion layer may be formed by, for example, applying a liquid composition containing the matrix material and the wavelength conversion material, and as required, the additive. For example, when the matrix material is the resin, the wavelength conversion layer may be formed by applying a liquid composition containing the matrix material and the wavelength conversion material, and as required, the additive, a solvent, and a polymerization initiator onto any appropriate support, and then drying and/or curing the liquid composition. The solvent and the polymerization initiator may be appropriately set depending on the kind of the matrix material (resin) to be used. Any appropriate application method may be used as an application method. Specific examples thereof include a curtain coating method, a dip coating method, a spin coating method, a print coating method, a spray coating method, a slot coating method, a roll coating method, a slide coating method, a blade coating method, a gravure coating method, and a wire bar method. Curing conditions may be appropriately set depending on, for example, the kind of the matrix material (resin) to be used and the composition of the composition. When the wavelength conversion material is added to the matrix material, the wavelength conversion material may be added in a state of particles, or may be added in a state of a dispersion liquid by being dispersed in a solvent. The wavelength conversion layer may be formed on the barrier layer.

The wavelength conversion layer formed on the support may be transferred onto another constituent element of the optical member (e.g., the barrier layer, the low-refractive index layer, or one of the prism sheets).

F. Light Diffusing Layer

The light diffusing layer may be formed of a light diffusing element, or may be formed of a light diffusing pressure-sensitive adhesive. The light diffusing element includes a matrix and light-diffusible fine particles dispersed in the matrix. The light diffusing pressure-sensitive adhesive has a matrix formed of a pressure-sensitive adhesive.

The light diffusing performance of the light diffusing layer may be represented by, for example, a haze value and/or a light diffusing half-value angle. The haze value of the light diffusing layer is preferably from 50% to 95%, more preferably from 60% to 95%, still more preferably from 70% to 95%. The setting of the haze value within the above-mentioned range provides desired diffusing performance and hence can satisfactorily suppress the occurrence of the moire. The light diffusing half-value angle of the light diffusing layer is preferably from 5° to 50°, more preferably from 10° to 30°. The light diffusing performance of the light diffusing layer may be controlled by adjusting, for example, a constituent material for the matrix (the pressure-sensitive adhesive in the case of the light diffusing pressure-sensitive adhesive), and a constituent material for, and the volume-average particle diameter and blending amount of, the light-diffusible fine particles.

The total light transmittance of the light diffusing layer is preferably 75% or more, more preferably 80% or more, still more preferably 85% or more.

The thickness of the light diffusing layer may be appropriately adjusted depending on, for example, its configuration and diffusing performance. For example, when the light diffusing layer is formed of the light diffusing element, the thickness is preferably from 5 µm to 200 µm. In addition, for example, when the light diffusing layer is formed of the light diffusing pressure-sensitive adhesive, the thickness is preferably from 5 µm to 100 µm.

As described above, the light diffusing layer may be formed of the light diffusing element, or may be formed of the light diffusing pressure-sensitive adhesive. When the light diffusing layer is formed of the light diffusing element, the light diffusing layer includes a matrix and light-diffusible fine particles dispersed in the matrix. The matrix is formed of, for example, an ionizing radiation-curable resin. Examples of the ionizing radiation include UV light, visible light, an infrared ray, and an electron beam. Of those, UV light is preferred, and hence the matrix is preferably formed of a UV-curable resin. Examples of the UV-curable resin include an acrylic resin, an aliphatic (e.g., polyolefin) resin, and a urethane-based resin. The light-diffusible fine particles are as described later for an embodiment in which the light diffusing layer is formed of the light diffusing pressure-sensitive adhesive.

The light diffusing layer is preferably formed of the light diffusing pressure-sensitive adhesive. The adoption of such configuration eliminates the need for an adhesion layer (an adhesive layer or a pressure-sensitive adhesive layer) needed in the case where the light diffusing layer is formed of the light diffusing element. Accordingly, the adoption of such configuration can contribute to the thinning of the optical member (consequently, a liquid crystal display apparatus) and eliminate the adverse effects of the adhesion layer on the display characteristics of the liquid crystal display apparatus. In this case, the light diffusing layer contains a pressure-sensitive adhesive and light-diffusible fine particles dispersed in the pressure-sensitive adhesive. Any appropriate pressure-sensitive adhesive may be used as the pressure-sensitive adhesive. Specific examples thereof include a rubber-based pressure-sensitive adhesive, an acrylic pressure-sensitive adhesive, a silicone-based pressure-sensitive adhesive, an epoxy-based pressure-sensitive adhesive, and a cellulose-based pressure-sensitive adhesive. Of those, an acrylic pressure-sensitive adhesive is preferred. The use of the acrylic pressure-sensitive adhesive can provide a light diffusing layer excellent in heat resistance and transparency. The pressure-sensitive adhesives may be used alone or in combination thereof.

Any appropriate acrylic pressure-sensitive adhesive may be used as the acrylic pressure-sensitive adhesive. The glass transition temperature of the acrylic pressure-sensitive adhesive is preferably from −60° C. to −10° C., more preferably from −55° C. to −15° C. The weight-average molecular weight of the acrylic pressure-sensitive adhesive is preferably from 200,000 to 2,000,000, more preferably from 250,000 to 1,800,000. The use of the acrylic pressure-sensitive adhesive having such characteristics can provide an appropriate pressure-sensitive adhesive property. The refractive index of the acrylic pressure-sensitive adhesive is preferably from 1.40 to 1.65, more preferably from 1.45 to 1.60.

The acrylic pressure-sensitive adhesive is generally obtained by polymerizing a main monomer that provides a pressure-sensitive adhesive property, a comonomer that provides cohesiveness, and a functional group-containing monomer serving as a cross-linking point while providing a pressure-sensitive adhesive property. The acrylic pressure-sensitive adhesive having the above-mentioned characteristics may be synthesized by any appropriate method, and may be synthesized, for example, with reference to the "Chemistry and application of adhesion/pressure-sensitive adhesion" by Katsuhiko Nakamae published by Dainippon Tosho Publishing Co., Ltd.

The content of the pressure-sensitive adhesive in the light diffusing layer is preferably from 50 wt % to 99.7 wt %, more preferably from 52 wt % to 97 wt %.

Any appropriate light-diffusible fine particles may be used as the light-diffusible fine particles. Specific examples thereof include inorganic fine particles and polymer fine particles. The light-diffusible fine particles are preferably polymer fine particles. Examples of a material for the polymer fine particles include a silicone resin, a methacrylic resin (e.g., polymethyl methacrylate), a polystyrene resin, a polyurethane resin, and a melamine resin. Those resins each have excellent dispersibility in a pressure-sensitive adhesive and an appropriate refractive index difference from the pressure-sensitive adhesive, and hence allow a light diffusing layer excellent in diffusing performance to be obtained. Of those, a silicone resin or polymethyl methacrylate is preferred. The shape of each of the light-diffusible fine particles may be, for example, a true spherical shape, a flat shape, or an amorphous shape. The light-diffusible fine particles may be used alone or in combination thereof.

The volume-average particle diameter of the light-diffusible fine particles is preferably from 1 µm to 10 µm, more preferably from 1.5 µm to 6 µm. When the volume-average particle diameter is set to fall within the above-mentioned range, a light diffusing layer having excellent light diffusing performance can be obtained. The volume-average particle diameter may be measured with, for example, an ultracentrifugal automatic particle size distribution-measuring apparatus.

The refractive index of each of the light-diffusible fine particles is preferably from 1.30 to 1.70, more preferably from 1.40 to 1.65.

The absolute value of a refractive index difference between each of the light-diffusible fine particles and the matrix (typically an ionizing radiation-curable resin or a pressure-sensitive adhesive) is preferably more than 0 and 0.2 or less, more preferably more than 0 and 0.15 or less, still more preferably from 0.01 to 0.13.

The content of the light-diffusible fine particles in the light diffusing layer is preferably from 0.3 wt % to 50 wt %, more preferably from 3 wt % to 48 wt %. When the content of the light-diffusible fine particles is set to fall within the above-mentioned range, a light diffusing layer having excellent light diffusing performance can be obtained.

G. Low-Refractive Index Layer

The refractive index of the low-refractive index layer is preferably as close to the refractive index (1.00) of air as possible. Specifically, the refractive index of the low-refractive index layer is preferably 1.30 or less, more preferably 1.20 or less, still more preferably 1.15 or less. The lower limit of the refractive index of the low-refractive index layer is, for example, 1.01. When the refractive index of the low-refractive index layer falls within such range, a liquid crystal display apparatus having high brightness while achieving remarkable thinning through the elimination of an air layer can be achieved.

The low-refractive index layer typically has a void in itself. The void ratio of the low-refractive index layer may take any appropriate value. The void ratio is, for example, from 5% to 99%, preferably from 25% to 95%. When the void ratio falls within the range, the low-refractive index layer can be sufficiently reduced in refractive index, and a high mechanical strength can be obtained.

The low-refractive index layer having a void in itself may be formed of, for example, a structure having at least one shape selected from a particle shape, a fibrous shape, and a flat plate-like shape. Structural bodies (constituent units) forming the particle shape may be solid particles, or may be hollow particles, and specific examples thereof include silicone particles, silicone particles having fine pores, silica hollow nanoparticles, and silica hollow nanoballoons. The constituent unit of the fibrous shape is, for example, nanofiber having a nanosize diameter, and specific examples thereof include cellulose nanofiber and alumina nanofiber. An example of the constituent unit of the flat plate-like shape is nanoclay, and a specific example thereof is nanosized bentonite (e.g., KunipiaF [product name]). In addition, in the void structure of the low-refractive index layer, the constituent units formed of a single or one kind, or a plurality of kinds, which form the void structure, contain, for example, portions that are chemically bonded to each other directly or indirectly, through a catalytic action. In the present invention, that the constituent units are "bonded to each other indirectly" means that the constituent units are bonded to each other through intermediation of a binder component in a small amount that is a constituent unit amount or less. That the constituent units are "bonded to each other directly" means that the constituent units are directly bonded to each other without through a binder component or the like.

Any appropriate material may be adopted as a material for forming the low-refractive index layer. For example, materials described in WO 2004/113966 A1, JP 2013-254183 A, and JP 2012-189802 A may each be adopted as the material. Specific examples thereof include: silica-based compounds; hydrolyzable silanes, and partial hydrolysates and dehydration condensates thereof; organic polymers; silicon compounds each containing a silanol group; active silica obtained by bringing a silicate into contact with an acid or an ion exchange resin; polymerizable monomers (e.g., a (meth)acrylic monomer and a styrene-based monomer); curable resins (e.g., a (meth)acrylic resin, a fluorine-containing resin, and a urethane resin); and a combination thereof.

Examples of the organic polymers include polyolefins (e.g., polyethylene and polypropylene), polyurethanes, fluorine-containing polymers (e.g., a fluorine-containing copolymer having, as structural components, a fluorine-containing monomer unit and a structural unit for imparting crosslinking reactivity), polyesters (e.g., a poly(meth)acrylic acid derivative (the term "(meth)acrylic acid" as used herein refers to acrylic acid and methacrylic acid, and the term "(meth)" is always used in such meaning)), polyethers, polyamides, polyimides, polyureas, and polycarbonates.

The material preferably contains: a silica-based compound; or a hydrolyzable silane, or a partial hydrolysate or a dehydration condensate thereof.

Examples of the silica-based compound include: $SiO_2$ (silicic anhydride); and a compound containing $SiO_2$, and at least one compound selected from the group consisting of $Na_2O$—$B_2O_3$ (borosilicic acid), $Al_2O_3$ (alumina), $B_2O_3$, $TiO_2$, $ZrO_2$, $SnO_2$, $Ce_2O_3$, $P_2O_5$, $Sb_2O_3$, $MoO_3$, $ZnO_2$, $WO_3$, $TiO_2$—$Al_2O_3$, $TiO_2$—$ZrO_2$, $In_2O_3$—$SnO_2$, and $Sb_2O_3$—$SnO_2$ (the symbol "-" means that a compound of interest is a complex oxide).

An example of the hydrolyzable silane is a hydrolyzable silane containing an alkyl group that may have a substituent (e.g., fluorine). The hydrolyzable silane, and the partial hydrolysate and dehydration condensate thereof are preferably an alkoxysilane and a silsesquioxane.

The alkoxysilane may be a monomer or an oligomer. The alkoxysilane monomer preferably has 3 or more alkoxyl groups. Examples of the alkoxysilane monomer include methyltrimethoxysilane, methyltriethoxysilane, phenyltriethoxysilane, tetramethoxysilane, tetraethoxysilane, tetrabutoxysilane, tetrapropoxysilane, diethoxydimethoxysilane, dimethyldimethoxysilane, and dimethyldiethoxysilane. The alkoxysilane oligomer is preferably a polycondensate obtained by hydrolyzing and polycondensing any of the above-mentioned monomers. The use of the alkoxysilane as the material provides a low-refractive index layer having excellent uniformity.

The silsesquioxane is a generic term for network polysiloxane represented by a general formula $RSiO_{1.5}$, where R represents an organic functional group. Examples of R include an alkyl group (which may be linear or branched, and has 1 to 6 carbon atoms), a phenyl group, and an alkoxy group (e.g., a methoxy group and an ethoxy group). Examples of the structure of the silsesquioxane include a ladder-type structure and a cage-type structure. The use of the silsesquioxane as the material provides a low-refractive index layer having excellent uniformity, excellent weatherability, excellent transparency, and an excellent hardness.

Any appropriate particles may be adopted as the particles. The particles are each typically formed of a silica-based compound.

The shapes of the silica particles may be confirmed by, for example, observation with a transmission electron microscope. The average particle diameter of the particles is, for example, from 5 nm to 200 nm, preferably from 10 nm to 200 nm. The presence of the above-mentioned configuration can provide a low-refractive index layer having a sufficiently low refractive index and can maintain the transparency of the low-refractive index layer. The term "average particle diameter" as used herein means a value determined by using a specific surface area ($m^2$/g) measured by a nitrogen adsorption method (BET method) from an equation "average particle diameter=(2,720/specific surface area)" (see JP 01-317115 A).

Examples of a method of obtaining the low-refractive index layer include methods described in JP 2010-189212 A, JP 2008-040171 A, JP 2006-011175 A, WO 2004/113966 A1, and references thereof. Specific examples thereof include: a method involving hydrolyzing and polycondensing at least one of a silica-based compound, or a hydrolyzable silane, or a partial hydrolysate or a dehydration condensate thereof; a method involving using porous particles and/or hollow fine particles; a method involving utilizing a spring-back phenomenon to produce an aerogel layer; and a method involving using a pulverized gel, which is obtained by pulverizing a gel obtained by a sol-gel method and chemically bonding fine porous particles in the pulverized liquid to each other with a catalyst or the like. However, the method of obtaining the low-refractive index layer is not limited to those production methods, and the layer may be produced by any production method.

The haze of the low-refractive index layer is, for example, from 0.1% to 30%, preferably from 0.2% to 10%.

With regard to the mechanical strength of the low-refractive index layer, for example, its scratch resistance against BEMCOT (trademark) is desirably from 60% to 100%.

When the low-refractive index layer is formed to be adjacent to the wavelength conversion layer, an anchoring force between the low-refractive index layer and the wavelength conversion layer is not particularly limited, but is, for example, 0.01 N/25 mm or more, preferably 0.1 N/25 mm or more, more preferably 1 N/25 mm or more. In order to increase the mechanical strength or the anchoring force, the low-refractive index layer may be subjected to undercoating treatment, heating treatment, humidifying treatment, UV treatment, corona treatment, plasma treatment, or the like before or after the formation of a coating film, or in a step before or after bonding to any appropriate adhesion layer or another member.

The thickness of the low-refractive index layer is preferably from 100 nm to 5,000 nm, more preferably from 200 nm to 4,000 nm, still more preferably from 300 nm to 3,000 nm, particularly preferably from 500 nm to 2,000 nm. When the thickness of the low-refractive index layer falls within such range, a low-refractive index layer expressing an optically sufficient function for light in a visible light region and having excellent durability can be achieved.

K. Barrier Layer

The barrier layer preferably has a barrier function against oxygen and/or water vapor. The arrangement of the barrier layer prevents deterioration of the wavelength conversion material due to oxygen and/or water vapor. As a result, a longer life of the function of the wavelength conversion layer can be achieved. The oxygen transmission rate of the barrier layer is preferably 500 cc/m$^2$·day·atm or less, more preferably 100 cc/m$^2$·day·atm or less, still more preferably 50 cc/m$^2$·day·atm or less. The oxygen transmission rate may be measured under an atmosphere at 25° C. and 100% RH by a measurement method in conformity to JIS K7126. The water vapor transmission rate (moisture vapor transmission rate) of the barrier layer is preferably 500 g/m$^2$·day or less, more preferably 100 g/m$^2$·day or less, still more preferably 50 g/m$^2$·day or less.

The barrier layer is typically a laminated film obtained by laminating, for example, a metal-deposited film, an oxide film, oxynitride film, or nitride film of a metal or silicon, or a metal foil on a resin film. The resin film may be absent depending on the configuration of the optical member. The resin film may preferably have a barrier function, transparency, and/or optical isotropy. Specific examples of such resin include a cyclic olefin-based resin, a polycarbonate-based resin, a cellulose-based resin, a polyester-based resin, and an acrylic resin. Of those, a cyclic olefin-based resin (e.g., a norbornene-based resin), a polyester-based resin (e.g., polyethylene terephthalate (PET)), or an acrylic resin (e.g., an acrylic resin having a cyclic structure, such as a lactone ring or a glutarimide ring, in a main chain thereof) is preferred. Those resins may each be excellent in balance among a barrier function, transparency, and optical isotropy.

Examples of the metal of the metal-deposited film include In, Sn, Pb, Cu, Ag, and Ti. Examples of their metal oxides include ITO, IZO, AZO, $SiO_2$, MgO, SiO, SixOy, $Al_2O_3$, GeO, and $TiO_2$. Examples of the metal foil include aluminum foil, copper foil, and stainless-steel foil.

In addition, an active barrier film may be used as the barrier layer. The active barrier film is a film capable of reacting with oxygen and actively absorbing oxygen. The active barrier film is commercially available. Specific examples of the commercially available product include "Oxyguard" manufactured by Toyobo Co., Ltd., "AGELESS OMAC" manufactured by Mitsubishi Gas Chemical Company, Inc., "OxyCatch" manufactured by Kyodo Printing Co., Ltd., and "EVAL AP" manufactured by Kuraray Co., Ltd.

The thickness of the barrier layer is, for example, from 50 nm to 50 μm.

I. Polarizing Plate Set

In an embodiment in which the optical member includes a polarizing plate, the optical member may be typically used as a polarizing plate to be arranged on the opposite side of a liquid crystal display apparatus to its viewer side (hereinafter sometimes referred to as "back-surface side polarizing plate"). In addition, in an embodiment in which the optical member with a wavelength conversion layer includes a polarizing plate, the optical member with a wavelength conversion layer may be typically used as a back-surface side polarizing plate to be arranged on the opposite side of a liquid crystal display apparatus to its viewer side. In this case, a polarizing plate set including the back-surface side polarizing plate and a viewer side polarizing plate may be provided. Any appropriate polarizing plate may be adopted as the viewer side polarizing plate. The viewer side polarizing plate typically includes a polarizer (e.g., an absorption-type polarizer) and a protective layer arranged on at least one side of the polarizer. The polarizer and protective layer described in the section D may be used as the polarizer and the protective layer. The viewer side polarizing plate may further include any appropriate optically functional layer (e.g., a retardation layer, a hard coat layer, an antiglare layer, or an antireflection layer) depending on purposes. The polarizing plate set is arranged on respective sides of a liquid crystal cell so that the absorption axis of the viewer side polarizing plate (polarizer thereof) and the absorption axis of the back-surface side polarizing plate (polarizer thereof) may be substantially perpendicular or parallel to each other.

J. Liquid Crystal Display Apparatus

According to still another aspect of the present invention, there is provided a liquid crystal display apparatus. In an embodiment in which the optical member does not include a polarizing plate, the liquid crystal display apparatus includes: a liquid crystal cell; a viewer side polarizing plate, which is arranged on the viewer side of the liquid crystal cell; a back-surface side polarizing plate, which is arranged on the opposite side of the liquid crystal cell to the viewer side; the optical member described in the section A to the section H and a wavelength conversion member, which are arranged on the outside of the back-surface side polarizing plate; and a backlight unit, which is arranged on the outside of the optical member. In an embodiment in which the optical member with a wavelength conversion layer does not include a polarizing plate, the liquid crystal display apparatus includes: a liquid crystal cell; a viewer side polarizing plate, which is arranged on the viewer side of the liquid crystal cell; a back-surface side polarizing plate, which is arranged on the opposite side of the liquid crystal cell to the viewer side; the optical member with a wavelength conversion layer described in the section A to the section H, which is arranged on the outside of the back-surface side polarizing plate; and a backlight unit, which is arranged on the outside of the optical member with a wavelength conversion layer. In an embodiment in which the optical member includes a polarizing plate, the liquid crystal display apparatus includes: a liquid crystal cell; a polarizing plate, which is arranged on the viewer side of the liquid crystal cell; the optical member described in the section A to the section H and a wavelength conversion member, which are arranged on the opposite side of the liquid crystal cell to the viewer side; and a backlight unit, which is arranged on the outside of the optical member. In an embodiment in which the optical member with a wavelength conversion layer includes a polarizing plate, the liquid crystal display apparatus includes: a liquid crystal cell; a polarizing plate, which is arranged on the viewer side of the liquid crystal cell; the optical member with a wavelength conversion layer described in the section A to the section H, which is arranged on the opposite side of the liquid crystal cell to the viewer side; and a backlight unit, which is arranged on the outside of the optical member with a wavelength conversion layer. The configuration and driving mode of the liquid crystal cell, and the configuration of the backlight unit are well known in the art, and hence specific description thereof is omitted.

EXAMPLES

The present invention is specifically described below by way of Examples, but the present invention is not limited to Examples. Testing and evaluating methods in Examples are as described below. In addition, in Examples, "part(s)" and "%" are by weight unless otherwise specified.

(1) Measurement Method for Refractive Index and Thickness

A refractive index and a thickness were determined by performing reflection measurement with an ellipsometer (product name: "Woollam M-2000", manufactured by J.A. Woollam Co.).

(2) Evaluation Method for Color Shift

A liquid crystal display apparatus was caused to display a white image, and an x value and a y value for a hue at an azimuth angle of from 0° to 360° in a direction at a polar angle of from 0° to 60° were measured with a conoscope (manufactured by Autronic-Melchers GmbH).

Example 1

(Wavelength Conversion Material and Prism Sheet)

A commercially available tablet PC (manufactured by Amazon.com, Inc., product name: "Kindle Fire HDX 8.9") was dismantled, and a wavelength conversion material (wavelength conversion layer) and a prism sheet, which were included on its backlight side, were used.

(Reflective Polarizer)

A 40-inch TV manufactured by Sharp Corporation (product name: AQUOS, item's stock number: LC40-Z5) was dismantled, and a reflective polarizer was removed from its backlight member. Diffusing layers arranged on both surfaces of the reflective polarizer were removed, and the remainder was defined as a reflective polarizer of this Example.

(Production of Polarizing Plate)

A polymer film using polyvinyl alcohol as a main component [manufactured by Kuraray Co., Ltd., product name: "9P75R (thickness: 75 µm, average polymerization degree: 2,400, saponification degree: 99.9 mol %)"] was stretched to 1.2 times in its conveying direction while being immersed in a water bath for 1 minute, and was then stretched to 3 times with reference to a film that had not been stretched at all (original length) in the conveying direction while being dyed by being immersed in an aqueous solution having an iodine concentration of 0.3 wt % for 1 minute. Then, the stretched film was further stretched up to 6 times with reference to the original length in the conveying direction while being immersed in an aqueous solution having a boric acid concentration of 4 wt % and a potassium iodide concentration of 5 wt %. The resultant was dried at 70° C. for 2 minutes to provide a polarizer.

Meanwhile, a colloidal alumina-containing adhesive was applied onto one surface of a triacetylcellulose (TAC) film (manufactured by Konica Minolta, Inc., product name: "KC4UW", thickness: 40 µm), and the resultant was laminated on one surface of the polarizer obtained above by a roll-to-roll process so that their conveying directions were parallel to each other. The colloidal alumina-containing adhesive was prepared by dissolving 100 parts by weight of a polyvinyl alcohol-based resin having an acetoacetyl group (average polymerization degree: 1,200, saponification degree: 98.5 mol %, acetoacetylation degree: 5 mol %) and 50 parts by weight of methylolmelamine in pure water to prepare an aqueous solution having a solid content of 3.7 wt %, and adding, to 100 parts by weight of the aqueous solution, 18 parts by weight of an aqueous solution containing positively charged colloidal alumina (average particle diameter: 15 nm) at a solid content of 10 wt %. Subsequently, a TAC film having applied thereonto the colloidal alumina-containing adhesive was similarly laminated on the opposite surface of the polarizer by a roll-to-roll process so that their conveying directions were parallel to each other, followed by drying at 55° C. for 6 minutes. Thus, a polarizing plate having a configuration "TAC film/polarizer/TAC film" was obtained.

(Production of Optical Member)

The polarizing plate and reflective polarizer obtained above were bonded to each other through intermediation of an acrylic pressure-sensitive adhesive. Further, an acrylic photocurable adhesive was applied onto the surface of the reflective polarizer on the opposite side to the polarizing plate, and the convex portions of the prism sheet were allowed to adhere thereto to provide an optical member having a configuration "polarizing plate/reflective polarizer/prism sheet." In this case, the thickness of the adhesion layer on which the convex portions were subjected to point adhesion was 3 µm.

(Production of Liquid Crystal Display Apparatus using Optical Member)

Evaluation was performed using a liquid crystal display apparatus of an IPS mode (manufactured by Amazon.com, Inc., product name: "Kindle fire HDX 9.8"). On the lower side (back-surface side) of a liquid crystal cell thereof, the optical member obtained above, the prism sheet obtained above, and the wavelength conversion material obtained above were incorporated by separate arrangement in the stated order, and evaluation was performed. The hue of the resultant liquid crystal display apparatus was measured. The results are shown in Table 1.

Example 2

With the use of two prism sheets, an optical member having a configuration "polarizing plate/reflective polarizer/first prism sheet/second prism sheet" was obtained in the same manner as in Example 1 except that the convex portions of the second prism sheet were subjected to point adhesion to the flat surface of the first prism sheet. A liquid crystal display apparatus was obtained in the same manner as in Example 1 except that this optical member and the wavelength conversion material were incorporated by separate arrangement in the stated order. The resultant liquid crystal display apparatus was subjected to the same evaluation as that in Example 1. The results are shown in Table 1.

Example 3

(Formation of Low-refractive Index Layer)

To a mixed liquid obtained by dissolving 0.95 g of methyltrimethoxysilane (MTMS) serving as a precursor of a silicon compound in 2.2 g of dimethyl sulfoxide (DMSO), 0.5 g of a 0.01 mol/L oxalic acid aqueous solution was added, and the mixture was stirred at room temperature for 30 minutes to hydrolyze the MTMS. Thus, tris(hydroxy)methylsilane was produced. After that, to 5.5 g of DMSO, 0.38 g of ammonia water having a concentration of 28% and 0.2 g of pure water were added, and then the mixed liquid subjected to the hydrolysis treatment was further added. The mixture was stirred at room temperature for 15 minutes to perform gelation of the tris(hydroxy)methylsilane. Thus, a gelled silicon compound was obtained. The mixed liquid subjected to the gelation treatment was subjected to maturation treatment by being incubated as it was at 40° C. for 20 hours. Next, the gelled silicon compound subjected to the maturation treatment was crushed with a spatula into a granular shape having a size of from several millimeters to several centimeters. To the crushed product, 40 g of isopropyl alcohol (IPA) was added, and the mixture was lightly stirred. After that, the mixture was left to stand still at room temperature for 6 hours, and the solvent and catalyst in the gel were decanted. The same decantation treatment was repeated 3 times to complete solvent replacement. Then, the gelled silicon compound in the mixed liquid was subjected to pulverization treatment (high-pressure media-less pulverization). The pulverization treatment was performed by weighing out 1.85 g of the gelled silicon compound having completed the solvent replacement and 1.15 g of IPA in a 5 cm³ screw-capped vial, and then pulverizing the contents under the conditions of 50 W and 20 kHz for 2 minutes through the use of a homogenizer (product name: "UH-50", manufactured by SMT Corporation). As a result of the pulverization of the gelled silicon compound in the mixed liquid through the pulverization treatment, the mixed liquid became a sol liquid of the pulverized product. To 0.75 g of the sol liquid, a solution of a photobase generator (manufactured by Wako Pure Chemical Industries, Ltd., product name: "WPBG-266") in methyl ethyl ketone (MEK) at a concentration of 1.5% and a solution of bis(trimethoxysilyl) ethane in MEK at a concentration of 5% were added at a ratio of 0.062 g:0.036 g to provide an application liquid. The application liquid was applied onto the flat surface of the prism sheet by a bar coating method, and was dried at 100° C. for 1 minute. The applied film after the drying was subjected to UV irradiation with light having a wavelength of 360 nm at a light irradiation dose (energy) of 300 mJ/cm². Thus, a low-refractive index layer was formed on the flat surface of the prism sheet. The refractive index of the low-refractive index layer was 1.10, and the thickness of the low-refractive index layer was 1 µm.

(Production of Liquid Crystal Display Apparatus)

The polarizing plate and the reflective polarizer were bonded to each other through intermediation of an acrylic pressure-sensitive adhesive. Further, an acrylic photocurable adhesive was applied onto the surface of the reflective polarizer on the opposite side to the polarizing plate, and the convex portions of the prism sheet having the low-refractive index layer formed on its flat surface were allowed to adhere thereto. The low-refractive index layer and the wavelength conversion material were bonded to each other through intermediation of an acrylic adhesive to provide an optical member with a wavelength conversion layer. In this case, the thickness of the adhesion layer on which the convex portions were subjected to point adhesion was 3 µm. The optical member with a wavelength conversion layer has an integral structure "polarizing plate/reflective polarizer/prism sheet/low-refractive index layer/wavelength conversion layer."

A liquid crystal display apparatus was produced in the same manner as in Example 1 except that the optical member with a wavelength conversion layer obtained above was incorporated on the lower side (back-surface side) of the liquid crystal cell. The resultant liquid crystal display apparatus was subjected to the same evaluation as that in Example 1. The results are shown in Table 1.

Example 4

(Production of Light-Diffusible Adhesive)

100 Parts of an acrylic pressure-sensitive adhesive and 25.9 parts of light-diffusible fine particles (manufactured by Momentive Performance Materials Japan LLC, product name: "Tospearl 145", particle diameter: 4.5 µm) were mixed to provide a light-diffusible adhesive.

(Production of Liquid Crystal Display Apparatus)

An optical member with a wavelength conversion layer, and a liquid crystal display apparatus were obtained in the same manner as in Example 3 except that the polarizing plate and the reflective polarizer were bonded to each other through intermediation of the light-diffusible adhesive having a haze value of 80%. The optical member with a wavelength conversion layer has an integral structure "polarizing plate/light diffusing layer/reflective polarizer/prism sheet/low-refractive index layer/wavelength conversion layer." The resultant liquid crystal display apparatus was subjected to the same evaluation as that in Example 1. The results are shown in Table 1.

Comparative Example 1

A liquid crystal display apparatus was obtained in the same manner as in Example 1 except that a laminate of a polarizing plate and a reflective polarizer, two prism sheets, and a wavelength conversion material, which were obtained in the same manner as in Example 1, were incorporated by separate arrangement in the stated order. The resultant liquid crystal display apparatus was subjected to the same evaluation as that in Example 1. The results are shown in Table 1.

TABLE 1

|  | Point adhesion | Average hue x | Average hue y |
| --- | --- | --- | --- |
| Example 1 | Present | 0.294 | 0.367 |
| Example 2 | Present | 0.284 | 0.347 |
| Example 3 | Present | 0.294 | 0.363 |
| Example 4 | Present | 0.297 | 0.365 |
| Comparative Example 1 | Absent | 0.323 | 0.400 |

<Evaluation>

Figure 4:
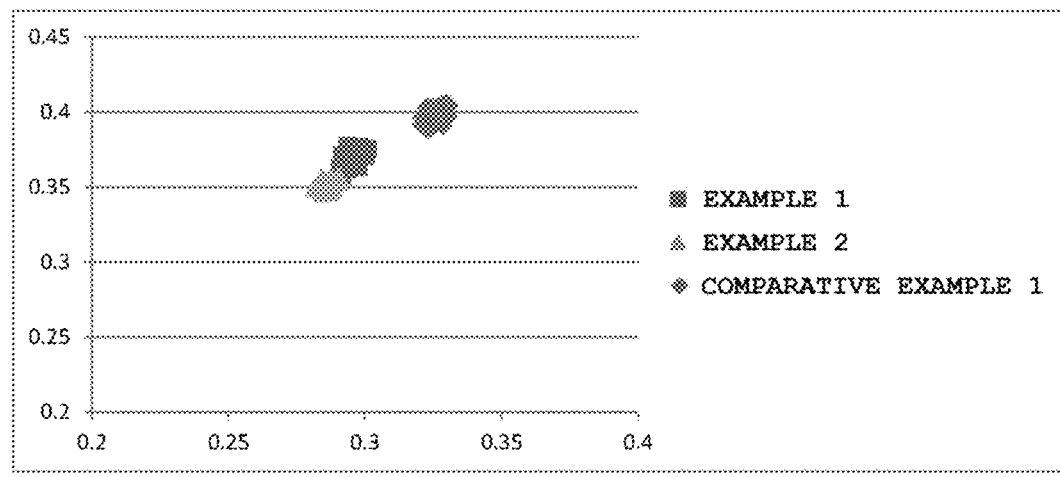
FIG. 4 is a chromaticity diagram for showing color shifts of liquid crystal display apparatus obtained in Examples and Comparative Example.

A chromaticity diagram corresponding to Table 1 is shown in FIG. 4 for comparison of Examples 1 and 2, and Comparative Example 1. As apparent from FIG. 4, it is found that nearly neutral hues are achieved in the liquid crystal display apparatus of Examples of the present invention. Meanwhile, it is found that the liquid crystal display apparatus of Comparative Example 1 is whitish and yellow-tinged.

INDUSTRIAL APPLICABILITY

The optical member of the present invention can be suitably used for a liquid crystal display apparatus. According to an embodiment in which the optical member includes a polarizing plate, the optical member can be suitably used as the back-surface side polarizing plate of the liquid crystal display apparatus. The liquid crystal display apparatus using such optical member can be used for various applications, such as portable devices including a personal digital assistant (PDA), a cellular phone, a watch, a digital camera, and a portable gaming machine, OA devices including a personal computer monitor, a notebook-type personal computer, and a copying machine, electric home appliances including a video camera, a liquid crystal television set, and a microwave oven, on-board devices including a reverse monitor, a monitor for a car navigation system, and a car audio, exhibition devices including an information monitor for a commercial store, security devices including a surveillance monitor, and caring/medical devices including a caring monitor and a medical monitor.

REFERENCE SIGNS LIST

10 first prism sheet
21 reflective polarizer 23 polarizing plate
25 absorption-type polarizer
30 second prism sheet
100 optical member
101 optical member

The invention claimed is:

1. An optical member with a wavelength conversion layer, comprising:
   a wavelength conversion layer;
   a prism sheet; and
   an optically functional element,
   the wavelength conversion layer, the prism sheet, and the optically functional element being integrated in the stated order,
   wherein the wavelength conversion layer is excited by absorbing light at a predetermined wavelength and thereby emits light at a wavelength that is different than the predetermined wavelength, the wavelength conversion layer converts a part of incident light having a blue to bluish purple color into green light and red light, and outputs another part thereof as it is as blue light,
   wherein the prism sheet has:
      a first main surface, which is flat; and
      a second main surface, on which a plurality of unit prisms each having a columnar shape convex toward an opposite side to the first main surface are arrayed, and
   wherein convex portions formed by the plurality of unit prisms on the second main surface of the prism sheet are bonded to one main surface of the optically functional element via adhesive,
   an air layer is eliminated at each of the bonded portions between the convex portions formed by the plurality of unit prisms on the second main surface of the prism sheet and the one main surface of the optically functional element and,
   a void portion is defined between each of concave portions on the second main surface of the prism sheet and the optically functional element.

2. The optical member with a wavelength conversion layer according to claim 1,
   wherein the optically functional element includes a reflective polarizer, and
   wherein the convex portions formed by the plurality of unit prisms on the second main surface of the prism sheet are bonded to one main surface of the reflective polarizer via adhesive.

3. The optical member with a wavelength conversion layer according to claim 1,
   wherein the optically functional element includes a polarizing plate, which includes an absorption-type polarizer, and
   wherein the convex portions formed by the plurality of unit prisms on the second main surface of the prism sheet are bonded to one main surface of the polarizing plate via adhesive.

4. The optical member with a wavelength conversion layer according to claim 1,
   wherein the optically functional element includes:
      a polarizing plate, which includes an absorption-type polarizer; and
      a reflective polarizer, and
      wherein the convex portions formed by the plurality of unit prisms on the second main surface of the prism sheet are bonded to a main surface of the reflective polarizer on an opposite side to the polarizing plate via adhesive.

5. The optical member with a wavelength conversion layer according to claim 2, wherein the optically functional element further includes a light diffusing layer on an opposite side of the reflective polarizer to the prism sheet.

6. The optical member with a wavelength conversion layer according to claim 1,
   wherein the optically functional element includes in this order from a prism sheet side:
      a light diffusing layer;
      a polarizing plate, which includes an absorption-type polarizer; and a reflective polarizer, and
      wherein the convex portions formed by the plurality of unit prisms on the second main surface of the prism sheet are bonded to a main surface of the light diffusing layer on an opposite side to the polarizing plate via adhesive.

7. The optical member with a wavelength conversion layer according to claim 4, wherein the optically functional element further includes a light diffusing layer between the polarizing plate and the reflective polarizer.

8. The optical member with a wavelength conversion layer according to claim 1, further comprising a low-refractive index layer, which has a refractive index of 1.3 or less, between the wavelength conversion layer and the prism sheet.

9. The optical member with a wavelength conversion layer according to claim 1, further comprising another prism sheet on an opposite side of the prism sheet to the optically functional element,
   the another prism sheet, the prism sheet, and the optically functional element being integrated with each other,
   wherein the another prism sheet has:
      a first main surface, which is flat; and
      a second main surface, on which a plurality of unit prisms each having a columnar shape convex toward an opposite side to the first main surface are arrayed, and
      wherein convex portions formed by the plurality of unit prisms on the second mam surface of the another prism sheet are bonded to the first main surface of the prism sheet via adhesive.

10. The optical member with a wavelength conversion layer according to claim 9, further comprising a low-refractive index layer, which has a refractive index of 1.3 or less, between the wavelength conversion layer and the another prism sheet.

11. A polarizing plate set, comprising:
    the optical member with a wavelength conversion layer of claim 1, which is used as a back-surface side polarizing plate; and
    a viewer side polarizing plate.

12. A liquid crystal display apparatus, comprising:
    a liquid crystal cell;
    a viewer side polarizing plate, which is arranged on a viewer side of the liquid crystal cell; and
    the optical member with a wavelength conversion layer of claim 1, which is arranged on an opposite side of the liquid crystal cell to the viewer side.

13. A liquid crystal display apparatus, comprising:
    a liquid crystal cell;
    a viewer side polarizing plate, which is arranged on a viewer side of the liquid crystal cell; and
    a wavelength conversion member and an optical member, which are arranged on an opposite side of the liquid crystal cell to the viewer side,
    wherein the wavelength conversion member is excited by absorbing light at a predetermined wavelength and thereby emits light at a wavelength that is different than the predetermined wavelength, the wavelength conversion layer converts a part of incident light having a blue to bluish purple color into green light and red light, and outputs another part thereof as it is as blue light, wherein the optical member includes an optically functional element and a prism sheet, the optically functional element and the prism sheet being integrated in the stated order from a liquid crystal cell side, wherein the prism sheet has:
- a first main surface, which is flat; and
- a second main surface, on which a plurality of unit prisms each having a columnar shape convex toward an opposite side to the first main surface are arrayed, and
- wherein convex portions formed by the plurality of unit prisms on the second main surface of the prism sheet are bonded to one main surface of the optically functional element via adhesive,
- an air layer is eliminated at each of the bonded portions between the convex portions formed by the plurality of unit prisms on the second main surface of the prism sheet and the one main surface of the optically functional element and,
- a void portion is defined between each of concave portions on the second main surface of the prism sheet and the optically functional element.

14. The liquid crystal display apparatus according to claim 13,
wherein the optically functional element includes a reflective polarizer, and
wherein the convex portions formed by the plurality of unit prisms on the second main surface of the prism sheet are bonded to one main surface of the reflective polarizer via adhesive.

15. The liquid crystal display apparatus according to claim 13,
wherein the optically functional element includes a polarizing plate, which includes an absorption-type polarizer, and
wherein the convex portions formed by the plurality of unit prisms on the second main surface of the prism sheet are bonded to one main surface of the polarizing plate via adhesive.

16. The liquid crystal display apparatus according to claim 13,
wherein the optically functional element includes:
a polarizing plate, which includes an absorption-type polarizer; and a reflective polarizer, and
wherein the convex portions formed by the plurality of unit prisms on the second main surface of the prism sheet are bonded to a main surface of the reflective polarizer on an opposite side to the polarizing plate via adhesive.

17. The liquid crystal display apparatus according to claim 14, wherein the
optically functional element further includes a light diffusing layer on an opposite side of the reflective polarizer to the prism sheet.

18. The liquid crystal display apparatus according to claim 13,
wherein the optically functional element includes in this order from a prism sheet side:
a light diffusing layer;
a polarizing plate, which includes an absorption-type polarizer; and a reflective polarizer, and
wherein the convex portions formed by the plurality of unit prisms on the second main surface of the prism sheet are bonded to a main surface of the light diffusing layer on an opposite side to the polarizing plate via adhesive.

19. The liquid crystal display apparatus according to claim 16, wherein the
optically functional element further includes a light diffusing layer between the polarizing plate and the reflective polarizer.

20. The liquid crystal display apparatus according to claim 13,
wherein the optical member further includes another prism sheet on an opposite side of the prism sheet to the optically functional element, the another prism sheet, the prism sheet, and the optically functional element being integrated with each other,
wherein the another prism sheet has:
a first main surface, which is flat; and
a second main surface, on which a plurality of unit prisms each having a columnar shape convex toward an opposite side to the first main surface are arrayed, and
wherein convex portions formed by the plurality of unit prisms on the second main surface of the another prism sheet are bonded to the first main surface of the prism sheet via adhesive.

* * * * *